US012748802B1

(12) United States Patent
Mahabadi et al.

(10) Patent No.: US 12,748,802 B1
(45) Date of Patent: Sep. 29, 2026

(54) VERIFICATION AND CITATION FOR LANGUAGE MODEL OUTPUTS

(71) Applicant: Amazon Technologies, Inc., Seattle, WA (US)

(72) Inventors: Ladan Mahabadi, Seattle, WA (US); Alexander Illichmann, Seattle, WA (US); Tong Ge, Belleville, NJ (US); Sudhir Hassan Manikya Raju, Bellevue, WA (US); Seema Yadav, Seattle, WA (US); Stebin Kodiamkunnel Sevichan, Everett, WA (US); Michiel David De Pooter, Seattle, WA (US); Francesco Furno, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/261,796

(22) Filed: Jul. 7, 2025

Related U.S. Application Data

(63) Continuation of application No. 18/759,778, filed on Jun. 28, 2024, now Pat. No. 12,353,469.

(51) Int. Cl.

| | |
|---|---|
| ***G06F 16/00*** | (2019.01) |
| ***G06F 16/332*** | (2019.01) |
| ***G06F 16/334*** | (2025.01) |
| ***G06F 16/383*** | (2019.01) |
| ***G06Q 50/18*** | (2012.01) |

(52) U.S. Cl.
CPC .......... *G06F 16/383* (2019.01); *G06F 16/332* (2019.01); *G06F 16/3344* (2019.01); *G06Q 50/18* (2013.01)

(58) Field of Classification Search
CPC .................................................. G06F 16/3344
See application file for complete search history.

(56) References Cited

U.S. PATENT DOCUMENTS

| | | | | |
|---|---|---|---|---|
| 12,182,311 | B1 | 12/2024 | Ardhanari et al. | |
| 2025/0278419 | A1 * | 9/2025 | Mui | G06F 40/295 |

OTHER PUBLICATIONS

Microsoft Corporation, “Architecture overview,” Microsoft Corporation, May 7, 2024, 5 pages.
Microsoft Corporation, “Data handling in Copilot for Finance (preview),” Microsoft Corporation, Mar. 14, 2024, 2 pages.
Microsoft Corporation, “Welcome to Copilot for Finance (preview),” Microsoft Corporation, Feb. 29, 2024, 2 pages.

* cited by examiner

*Primary Examiner* — Ajith Jacob
(74) *Attorney, Agent, or Firm* — Athorus, PLLC

(57) ABSTRACT

A user provides a question to be answered from detailed, dense or otherwise complex documents to a processing system that converts the question to a structured query language query and generates an embedding from the question, augmented by temporal data, synopses, themes, or other relevant information or data. The embedding is compared to embeddings generated from documents of a knowledge base to identify documents that are relevant to the question, and to rank such documents for their relevance. Highly ranking documents are combined with the query and provided to a language model that returns an answer to the question. A source for the answer is identified in at least one of the documents. The answer and the identified documents are presented to the user.

20 Claims, 13 Drawing Sheets

VERIFICATION AND CITATION FOR LANGUAGE MODEL OUTPUTS

CROSS-REFERENCE TO RELATED APPLICATIONS

This application is a continuation of U.S. patent application Ser. No. 18/759,778, now U.S. Pat. No. 12,353,469, filed Jun. 28, 2024, the contents of which are incorporated by reference herein in their entirety.

BACKGROUND

Large language models (or "LLM") have seen rapid advancements in recent years, and demonstrated impressive capabilities in natural language processing tasks such as text generation, question answering, and language understanding. Such models are typically trained on vast amounts of textual data, allowing the models to capture rich semantic and syntactic knowledge that can be leveraged for a wide range of applications. LLMs have been successfully applied across various domains, from general-purpose conversational assistants to specialized tools for use in fields such as healthcare, finance, and scientific research. As the capabilities of these models continue to grow, there is increasing interest in exploring novel ways to harness their power to enhance productivity, automate repetitive tasks, and unlock insights from unstructured data. However, effectively deploying LLMs often requires careful system design and integration with other components to address domain-specific challenges and requirements.

DETAILED DESCRIPTION

Figure 1A:
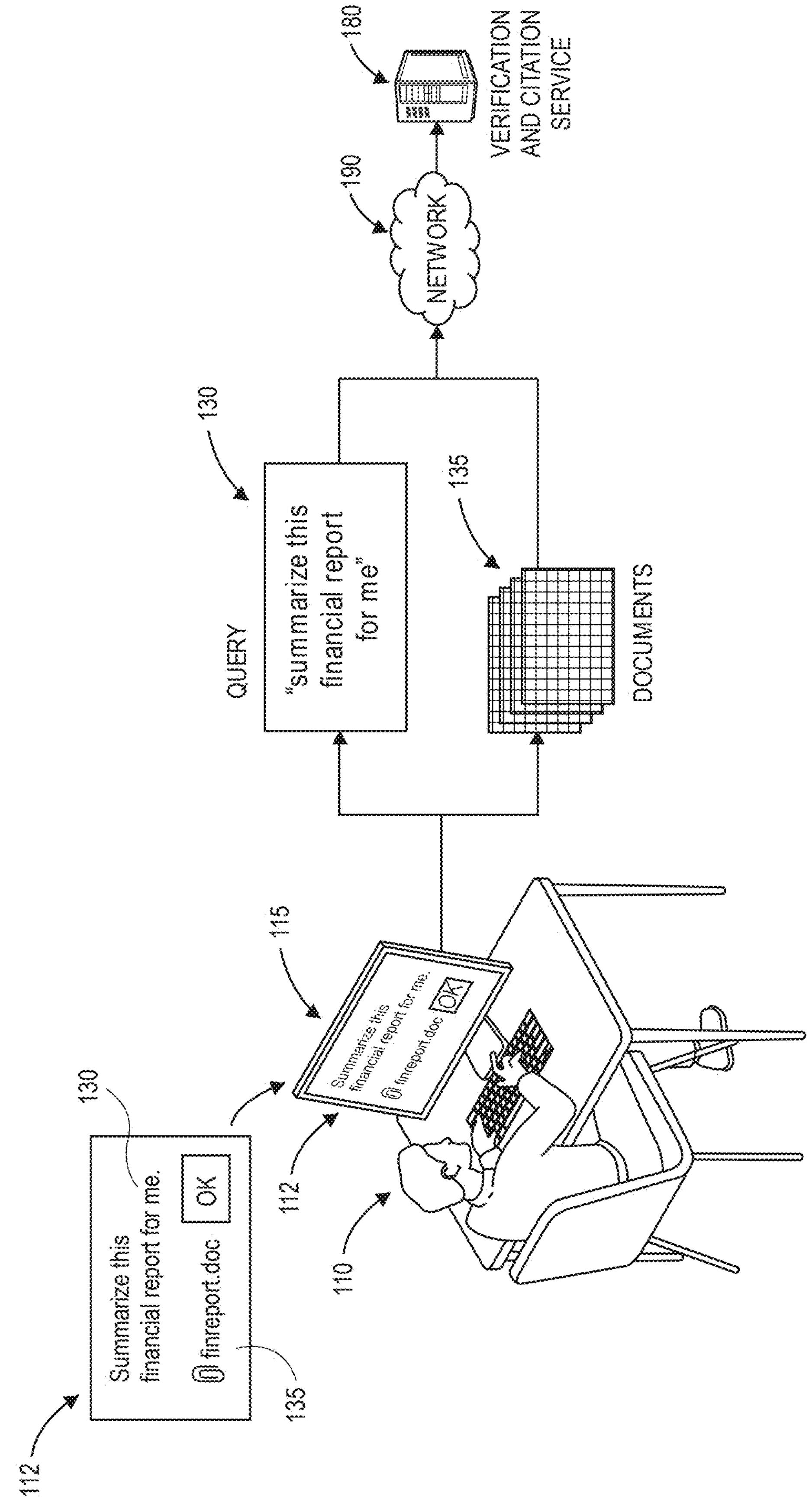
FIGS. 1A through 1G are views of aspects of one system in accordance with implementations of the present disclosure.

A key challenge in leveraging language models, such as large language models (or "LLM") for document retrieval and question answering is the need to accurately reproduce specific factual information contained within source materials, particularly in domains such as finance, where numerical values and temporal relationships are critical. LLMs trained on broad corpora can struggle to reliably generate text that faithfully represents precise details found in documents, and often hallucinate or approximate information based on learned statistical probabilities, rather than providing ground truth. Additionally, when querying documents spanning multiple time periods, LLMs can struggle to "understand" and "reason" about a temporal context to surface the most relevant and up-to-date information. Overcoming these limitations is essential for deploying LLM-powered systems in high-stakes, data-sensitive domains where accuracy is paramount.

These challenges, among others, are addressed by the disclosed systems and techniques for augmenting LLMs with specialized modules for data verification and temporal awareness. More specifically, one or more of the disclosed systems and techniques are designed to be temporally aware, enabling LLMs to surface the most relevant and up-to-date information when answering queries. Additionally, one or more of the disclosed systems and techniques can automatically validate any numerical values or other facts in LLM-generated outputs against ground truth data in databases, ensuring the accuracy of the information provided to users. LLM-generated responses may thus be validated, corrected if necessary, using identified ground truth, and returned to a user with citations to the ground truth source(s) (ex: specific documents or document sections, specific database entries). In some implementations, a query generator may convert a free-form description of what a user is looking for into a correctly structured database query (e.g., a SQL query), thereby allowing users to make database queries using intuitive natural language. By addressing unique challenges associated with domains such as finance, the disclosed systems and techniques provide reliable and trustworthy interfaces for users to leverage language models to uncover insights that may otherwise remain buried within their unstructured document collections.

Documents that are prepared in order to satisfy one or more regulatory requirements, or documents that, by their very nature, are required to include extensively detailed language or representations of data, may be difficult to digest or comprehend by an average reader. For example, where a company prepares an annual report on a Form 10-K in accordance with the Securities Exchange Act of 1934, the company must include information regarding the company's operations, and any risks that the company is facing, as well as the company's financial performance over a previous period of time, and the company's perspective on its own financial condition, together with financial statements and any additional data in the report. By some estimates, each Form 10-K report includes, on average, more than 40,000 words. As another example, a typical opinion issued by the United States Supreme Court includes nearly five thousand words, as well as countless citations to prior opinions of the Supreme Court or other legal documents, and are challenging to read and comprehend by those who are not trained attorneys. Likewise, many medical reports or journals include lengthy words or phrases that find their origins in Latin or other languages, and include laboratory reports or calculations, as well as detailed technical information and data.

Where a document such as a Form 10-K report, a judicial opinion, a medical study or another document is sufficiently detailed or dense, consuming information that is included in the document in order to gain a complete understanding of the document is often a burdensome, challenging and inefficient task. Moreover, where one or more of such documents contain data that must be read and understood in order to answer one or more questions, or to draw any number of conclusions, the documents typically must be reviewed in their entireties, or searched to identify relevant sections of the documents that are required in order to answer the questions or draw the conclusions. Furthermore, where a document includes multiple versions or editions that are generated or updated periodically, or where questions to be answered based on such documents or conclusions to be drawn from such documents change over time, the tasks of reading and understanding such documents, or searching such documents for relevant sections, must often be repeated for each version or edition, and for each such question or conclusion.

Although some examples in the present disclosure refer to LLMs, it will be appreciated that any suitable language model may be used in other examples. A language model is a type of artificial intelligence (or "AI") model that is trained on textual data to generate coherent and contextually relevant text. A "large" language model refers to a language model that has been trained on an extensive dataset and has a high number of parameters, enabling the model to capture complex language patterns and perform a wider range of tasks than other models. LLMs are designed to handle a wide range of natural language processing tasks, such as text completion, translation, summarization, and even conversation. A specific parameter count required for a model to be considered a "large" language model can vary depending on context and technological advancements. Traditionally, however, some large language models have millions to billions of parameters.

Further, although some examples presented herein focus on the use of the disclosed systems and techniques for document queries in the finance domain, it will be appreciated that the disclosed systems and techniques may also be used for document and database queries in other domains in which factual accuracy and temporal awareness are important for generating useful output from a language model. For example, queries may be made regarding a state of law reflected in a body of legal cases, with court holdings indexed and annotated with time information, such that LLM outputs can be verified to accurately reflect a current state of the law. It will be appreciated that the disclosed systems and techniques can be extended to a wide variety of domains including sports statistics, climate and environmental data, health and medical data, news, and the like. It will be appreciated that some such data may be particularly sensitive or regulated, and as such may be stored in restricted access databases with appropriate security safeguards, and that its usage and temporary storage by the systems and techniques of the present disclosure will also comply with applicable process and storage requirements, including using such data only as additional context for language model output generation and not for any training or fine tuning.

As is set forth in greater detail below, the present disclosure is directed to systems and methods for processing documents, or data contained therein. More specifically, the systems and methods of the present disclosure are directed to processing documents, preparing reports on contents of the documents and deriving insights from the documents, which may include unstructured datasets that are potentially large in size, e.g., by converting a free-form human description of a question or a data query into correct syntax with links or other references to appropriate sources for an answer to the question.

In some implementations, a user may provide a question, either independently or along with one or more relevant documents, to a computer device or system configured to execute one or more of the methods of the present disclosure. The question may be augmented with temporal information, synopses, themes of the question, or any other relevant information or data, before being converted to one or more embeddings or other vectors. Such embeddings or vectors may then serve as a basis for searching one or more data stores that include embeddings or other vectors representative of documents or excerpts of such documents. The one or more embedding vectors representative of the question may then be used to determine a set of documents that are responsive to the question. For example, the one or more embedding vectors may be projected into a multidimensional embedding space with document embedding vectors generated for different documents. Document embedding vectors that are closest (or within a defined distance, etc.) of the one or more embedding vectors generated for the question determined as the set of documents. The set of documents may also be ranked based on their similarity or distance of the document embedding vectors to the one or more embedding vectors generated for the question. Subsequently, the documents may be augmented with temporal information regarding the documents, synopses of the documents, or any other information or data that may be derived from or associated with their respective contents.

In some implementations, the systems and methods of the present disclosure may include one or more hardware components or software applications that enable professionals to write reports, answer questions, or extract insights from large amounts of unstructured data. Users of such systems and methods may provide documents in any number of formats, generate queries, and contextualize interactions with useful records with greater efficiency, regardless of the density or level of detail included within such documents. For example, in some implementations, a user may interact with a system to ask a general question such as, "attached are bylaws and incorporating documents of a non-profit organization, what are the organization's obligations under Generally Accepted Accounting Principles?" In accordance one or more implementations, the systems and methods of the present disclosure may respond with one or more factually and temporally accurate responses to the submitted questions that are based on the provided documents and optionally include links to sections within those documents relevant to the response, thereby providing supporting evidence for the response.

Generally, a user may upload documents in any format, and ask specific questions regarding the contents of such documents, such as "I have uploaded a financial table, can you summarize it for me?" or "I have attached a chain of electronic mail correspondence, can you please summarize the chain and identify any outstanding action items?" In some other implementations, a user may provide a knowledge base, a data store of documents, or any other information or data (which may be generally referred to herein as a knowledge base), and request that any responses to questions or otherwise reference information included in the knowledge base. Regardless of how a question is submitted, a response to the question will rely on or pull directly from documents or other information of a knowledge base and include or reference information one or more sections of the knowledge base to provide support for the response that is both factually and temporally accurate.

Referring to FIGS. 1A through 1G, views of aspects of one system in accordance with implementations of the present disclosure are shown. As is shown in FIG. 1A, a user 110 of a computer system 115 (e.g. a desktop computer or, alternatively, a tablet computer, a laptop computer, or any other personal device) provides a query 130 and a set of documents 135 to a verification and citation service (or one or more other services) 180 over one or more networks 190, which may include the Internet in whole or in part. The user 110 may provide the query 130 and commands or instructions to upload the set of documents 135 to the service 180 in any manner, such as by one or more physical or virtual keyboards, by one or more utterances of words captured by a microphone or another acoustic sensor, or by any other signals provided to one or more other input/output (or "I/O") devices. For example, as is shown in FIG. 1A, the user 110 enters the query 130 and provides instructions to upload the set of documents via one or more user interfaces rendered on a display 112 of the computer system 115.

Figure 1B:
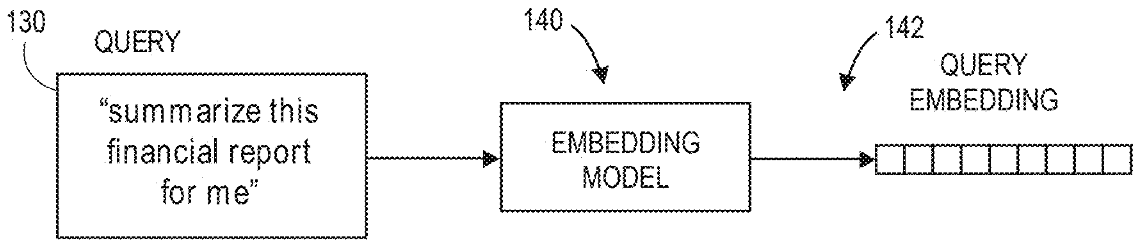

As is shown in FIG. 1B, once the query 130 and the documents 135 have been received by the service 180, the query 130 may be processed to generate a query embedding 142 representative of the query 130, e.g., by providing the query 130 as an input to one or more embedding models 140. For example, the query 130 may be broken into chunks, excerpts or other portions, and each of such chunks, excerpts or other portions may be provided to one or more embedding models 140 to generate a query embedding 142 representative of the query 130. Alternatively, or additionally, the query 130 and any number of the documents 135 may be broken into one or more chunks, excerpts or other portions and provided as inputs to the embedding models 140, and the query embedding 142 may be generated based on one or more outputs received from the embedding models 140 in response to the inputs.

Figure 1C:
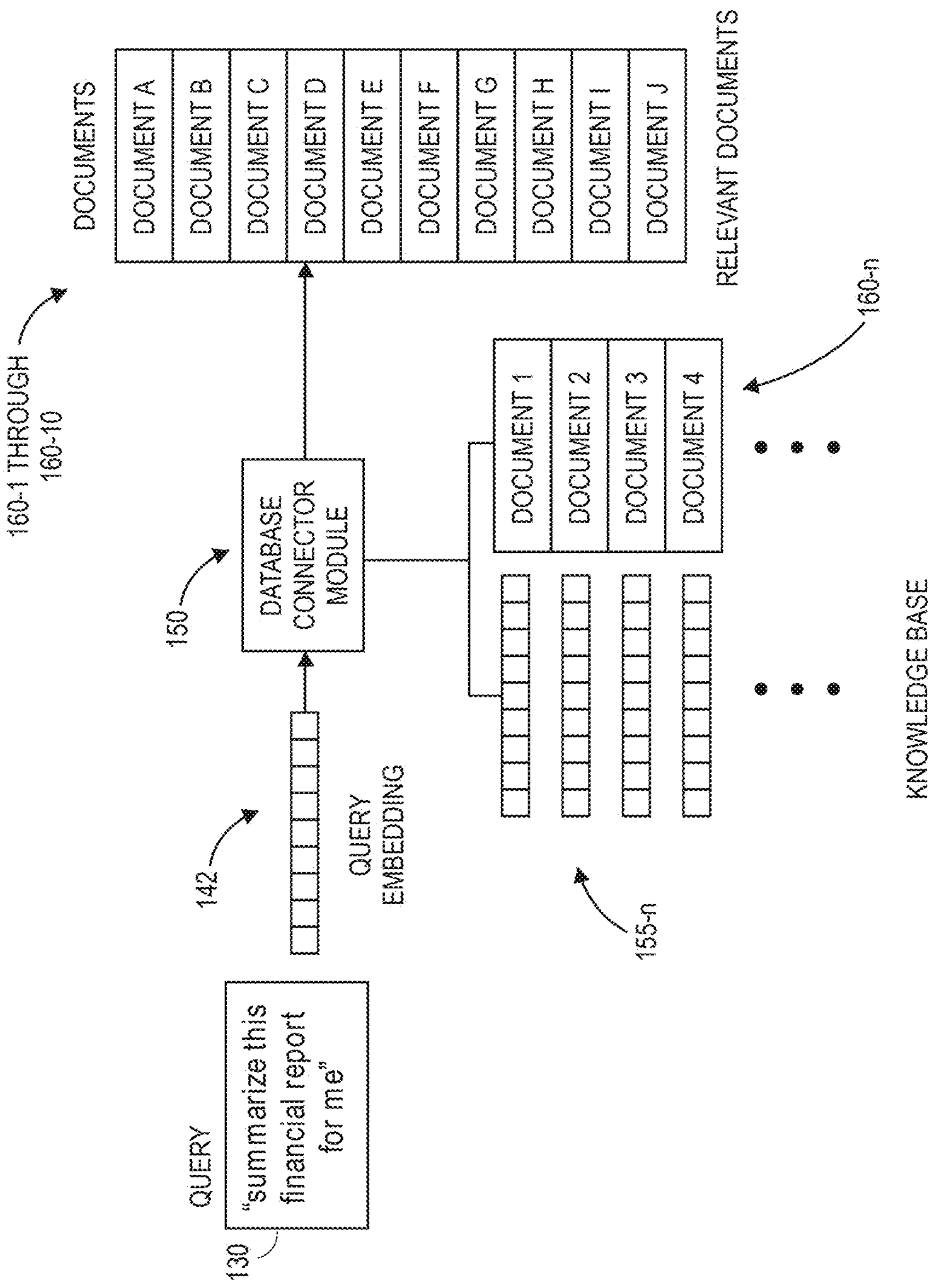

As is shown in FIG. 1C, a database connector module 150 (or another processing module) receives the query embedding 142 and compares the query embedding 142 to contents of a knowledge base stored on or otherwise accessible to the database connector module 150, to identify a set of documents that are most relevant to the query 130 received from the user 110. The database connector module 150 may include a specialized database or storage system designed to efficiently store, manage, and perform operations on embeddings stored therein or received thereby, as well as to perform one or more similarity analyses, or to compare such embeddings or other vectors according to any standard. As is shown in FIG. 1C, the knowledge base stored on the database connector module 150 may include a plurality of documents 160-*n*, as well as a plurality of embeddings 155-*n* generated based on each of such documents 160-*n*. Each of the documents 160-*n* may be provided as inputs to an embedding model, which may be the same embedding models 140 that generated the query embedding 142 based on the query 130, as shown in FIG. 1B, and the embeddings 155-*n* may be generated based on outputs received from the embedding models 140 in response to the respective documents 160-*n*.

In some implementations, the database connector module 150 may execute one or more similarity analyses (or dissimilarity analyses), proximity analyses, or any other technique by which similarity or dissimilarity of embeddings or other vectors may be determined, and identify documents corresponding to embeddings of the database connector module 150 that are most relevant to the query embedding 142 generated based on the query 130. For example, in some implementations, documents that are most relevant to the query embedding 142 may be determined by performing one or more of a k-nearest neighbor analysis or a cosine similarity analysis, or calculating a Canberra distance, a Chebychev distance, a Chi-square distance, a cosine distance, a Euclidean distance, a Hamming distance, a Jaccard distance, a Mahalanobis distance, a Manhattan distance, a Minkowski distance, a Sorensen-Dice distance, a Pearson correlation, a Spearman correlation, or any other score or metric between the query embedding 142 and each of the embeddings 155-*n*. The service 180 may further determine whether any scores or metrics so calculated are mathematically sound and satisfy one or more predetermined criteria.

As is shown in FIG. 1C, a set of ten documents 160-1 through 160-10 are identified based on the query embedding 142.

Figure 1D:
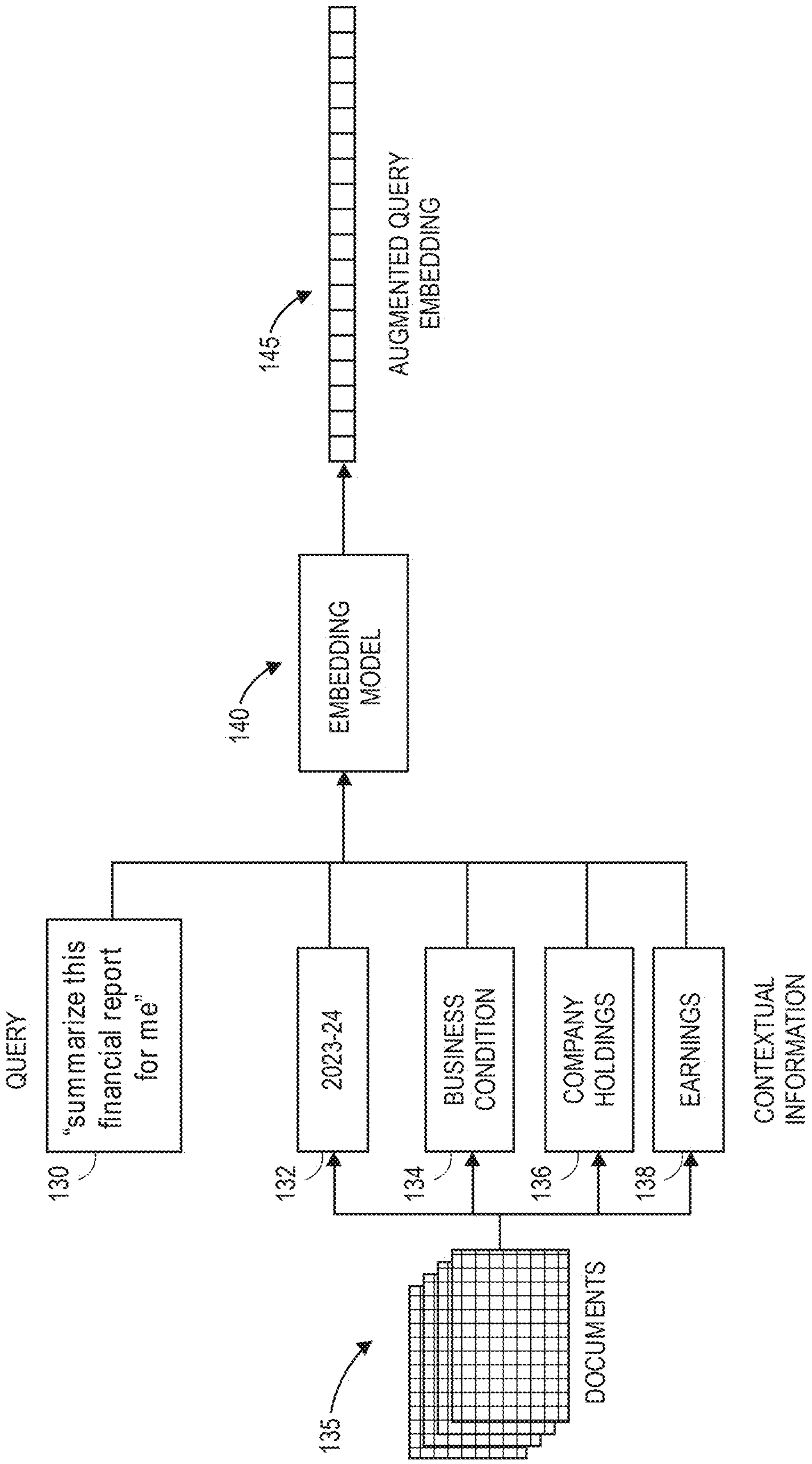

Subsequently, the query 130 may be augmented to include contextual information pertaining to the query 130, or temporal information, a synopsis of the question, a theme of question, or any other information or data regarding the query 130. For example, as is shown in FIG. 1D, the documents 135 received from the user 110 may be processed to determine a timeframe 132 associated with the query 130, e.g., a fiscal year or calendar year, as well as a theme 134 of the query 130, e.g., a business condition of the company, or summaries 136, 138 of the query 130, such as company holdings or earnings.

The query 130 is provided as one or more inputs to an embedding model 140 along with the timeframe 132, the theme 134, the summaries 136, 138 or any other contextual information as inputs to one or more embedding models 140. An augmented query embedding 145 may be generated based on outputs received from the one or more embedding models 140 in response to such inputs. In some implementations, the embedding models 140 that generate the augmented query embedding 145 may be different from the embedding models 140 that generated the query embedding 142 based on the query 130, as shown in FIG. 1B, and the augmented query embedding 145 may be in a different vector space from the query embedding 142. Alternatively, the embedding models 140 that generate the augmented query embedding 145 based on the query 130 and the contextual information may be the same embedding models 140 that generated the query embedding 142 based on the query 130, as shown in FIG. 1B, and the augmented query embedding 145 may be in the same vector space as the query embedding 142.

Figure 1E:
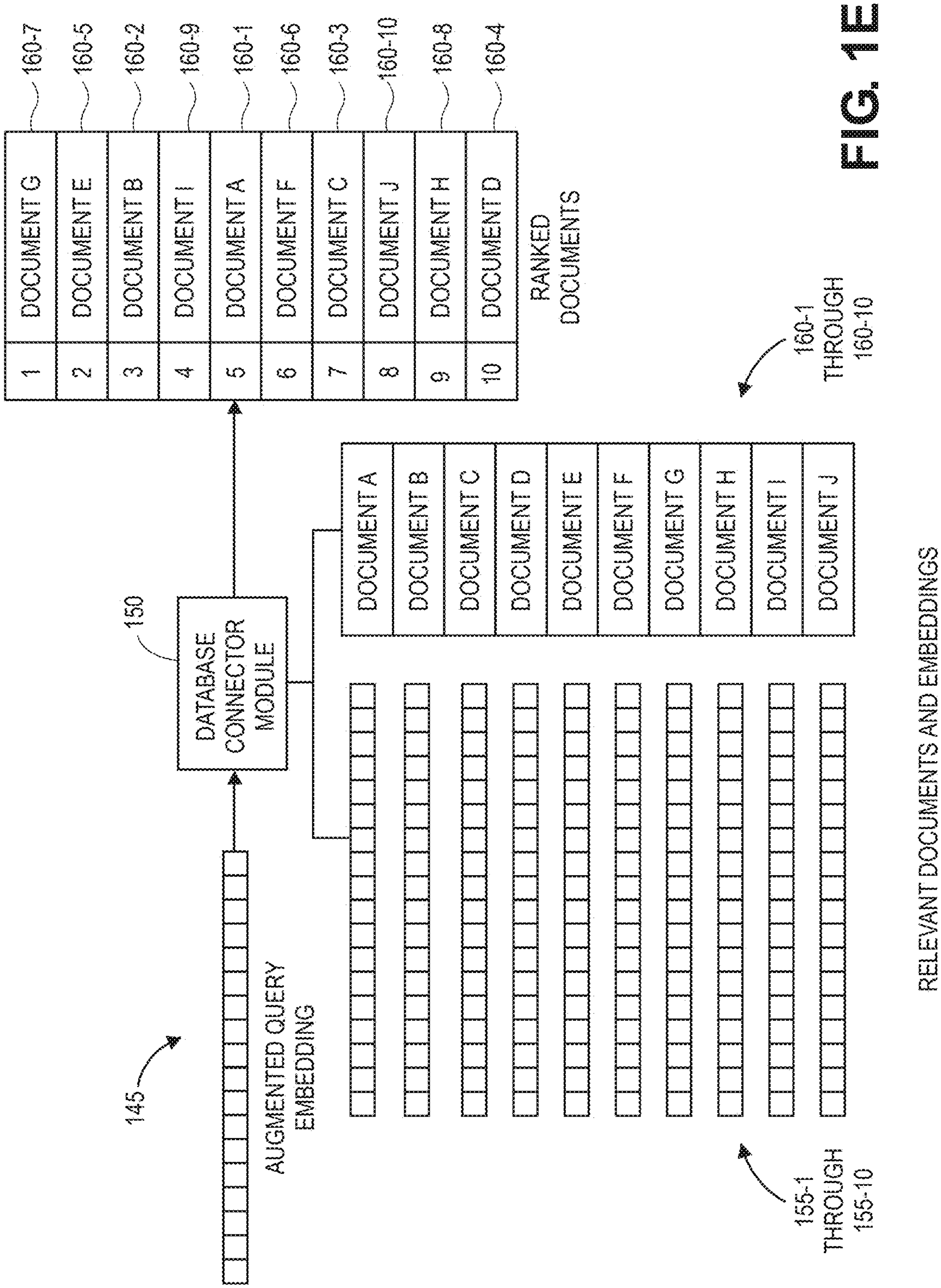

As is shown in FIG. 1E, the documents 160-1 through 160-10 identified by the database connector module 150 based on the query embedding 142 may be further ranked or sorted based on the augmented query embedding 145. In some implementations, the database connector module 150 may execute a similarity analysis (or a dissimilarity analysis), a proximity analysis, or any other technique by which similarity or dissimilarity of embeddings or other vectors may be determined, to filter or sort the documents 160-1 through 160-10 based on the similarity of the embeddings 155-1 through 155-10 generated therefrom to the augmented query embedding 145 to determine the similarity of the documents 160-1 through 160-10 to the query 130, as augmented by the contextual information. For example, in some implementations, the documents 160-1 through 160-10 may be ranked or sorted by performing one or more of a K-means clustering analysis or a cosine similarity analysis, or calculating a Canberra distance, a Chebychev distance, a Chi-square distance, a cosine distance, a Euclidean distance, a Hamming distance, a Jaccard distance, a Mahalanobis distance, a Manhattan distance, a Minkowski distance, a Sorensen-Dice distance, a Pearson correlation, a Spearman correlation, or any other score or metric between the augmented query embedding 145 and each of the embeddings 155-1 through 155-10. The service 180 may further determine whether any scores or metrics so calculated are mathematically sound and satisfy one or more predetermined criteria.

As is shown in FIG. 1E, the document 160-7 is identified as most relevant to the query 130 based on an embedding 155-7 generated from the document 160-7 and the augmented query embedding 145, followed by the document 160-5, the document 160-2, the document 160-9, the document 160-1, the document 160-6, the document 160-3, the document 160-10, the document 160-8, and the document 160-4.

In some implementations, the documents 160-1 through 160-10 may be identified or ranked automatically, e.g., by one or more similarity analyses. Alternatively, however, one or more of the documents 160-1 through 160-10 may be provided or presented to one or more users, and the one or more users may rank the documents, designate one or more of the documents as relevant, or otherwise modify a ranking of the documents.

The database connector module 150 may identify documents that are relevant to a query, or rank documents that are identified as relevant to a query, according to any method or technique. For example, in some implementations, documents of the database connector module 150 may be identified based on one similarity analysis, e.g., a k-nearest neighbor analysis, calculated between embeddings generated based on such documents and an embedding generated based on a query, and ranked based on another similarity analysis, e.g., a cosine similarity analysis, calculated between such embeddings and the embedding generated based on the query augmented with contextual information. Alternatively, or additionally, any other method or technique may be utilized to identify documents that are relevant to a query, or to rank such documents based on the query augmented with contextual information in accordance with implementations of the present disclosure.

Figure 1F:
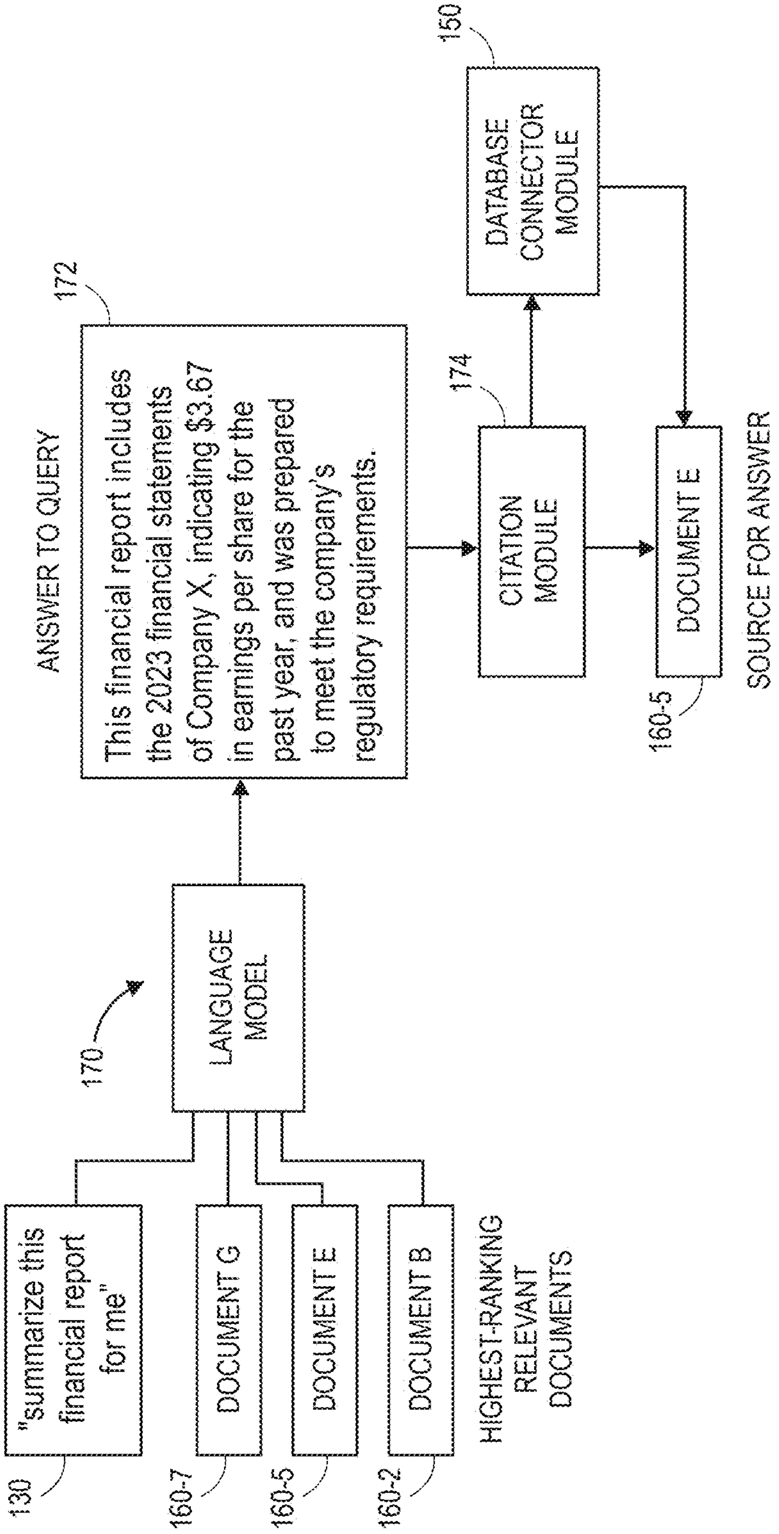

As is shown in FIG. 1F, once the documents 160-1 through 160-10 have been identified as relevant to the query 130 and ranked for relevance, the query 130 and one or more of the documents 160-1 through 160-10 may be provided as inputs to a language model (or language modeling module) 170 that is trained to generate conversational responses to such queries. The language model 170 may be an LLM, one or more natural language processing (or "NLP") models, one or more natural language understanding (or "NLU") models, or any other models, such as a pre-trained transformer model having one or more encoders or decoders, or one or more deep learning models, e.g., convolutional neural networks or recurrent neural networks, or any other neural networks. Moreover, the language model may have been trained based on one or more corpora of data that do not include any of the documents 160-*n*.

For example, as is shown in FIG. 1F, the query 130 and the documents 160-7, 160-5, 160-2 are provided as inputs to the language model 170, and the language model 170 provides one or more outputs or answers 172 that are generated based on the both the trained knowledge of the language model and the documents 160-7, 160-5, 160-2 provided as part of the input. In the illustrated example, the language model 170 provides, in response to an input of the query 130 and the highest-ranking relevant documents 160-7, 160-5, 160-2 the response of "This financial report includes the 2023 financial statements of Company X, indicating $3.87 in earnings per share for the past year, and was prepared to meet the company's regulatory requirements."

In some implementations, the answer 172 may be generated by one or more retrieval-augmented generation (or "RAG") techniques. A RAG technique may include or involve the retrieval of data from outside the language model 170, and augment the query 130 by adding relevant retrieved data as context. In this regard, a RAG technique may reduce hallucinations generated by the language model 170, by guiding outputs of the language model 170 to be similar to or based on the retrieved data, rather than outputs that are generated based purely on parameters of the language model 170 that were learned from one or more training corpora. For example, the language model 170 utilizes a RAG technique to determine specific information from the input documents (e.g., 2023 financial report, $3.87 in earning per share, or other information) that may provide support for the answer 172 provided by the language model 170.

Additionally, in some implementations, a source of the answer 172, viz., the document 160-5, may also be identified based at least in part on the outputs received from the language model 170. Where the answer 172 includes one or more numbers or other quantitative data points, e.g., financial numbers, the answer 172 may be provided to a citation module 174 that processes the answer 172 to identify a reference document or excerpt thereof, e.g., the document 160-5, as a source for the numbers. For example, in some implementations, the citation module 174 may execute a regular expression (or "RegEx") function on the answer 172 and contents of the knowledge base accessible to the database connector module 150, e.g., the documents 160-*n*, to identify one or more of the documents including strings of characters corresponding to or included in the answer 172. The regular expression function may be executed on the answer 172 and any number of the documents 160-*n*, including but not limited to the documents 160-1 through 160-10. Subsequently, the database connector module 150 further generates a query (e.g., a SQL query), runs the query on a ground truth database including the documents 160-*n*, and compares a response to the query (e.g., a ground truth response) against contents of the document 160-5 cited as the source in the answer 172. In some implementations, where the database connector module 150 or the citation module 174 identifies mismatch between the answer 172 and a number (e.g., a quantitative data point) identified in the document 160-5 cited as the source for the answer 172, the database connector module 150 may correct the answer 172 to include the number identified in the document 160-5, or present both numbers to the user 110.

Figure 1G:
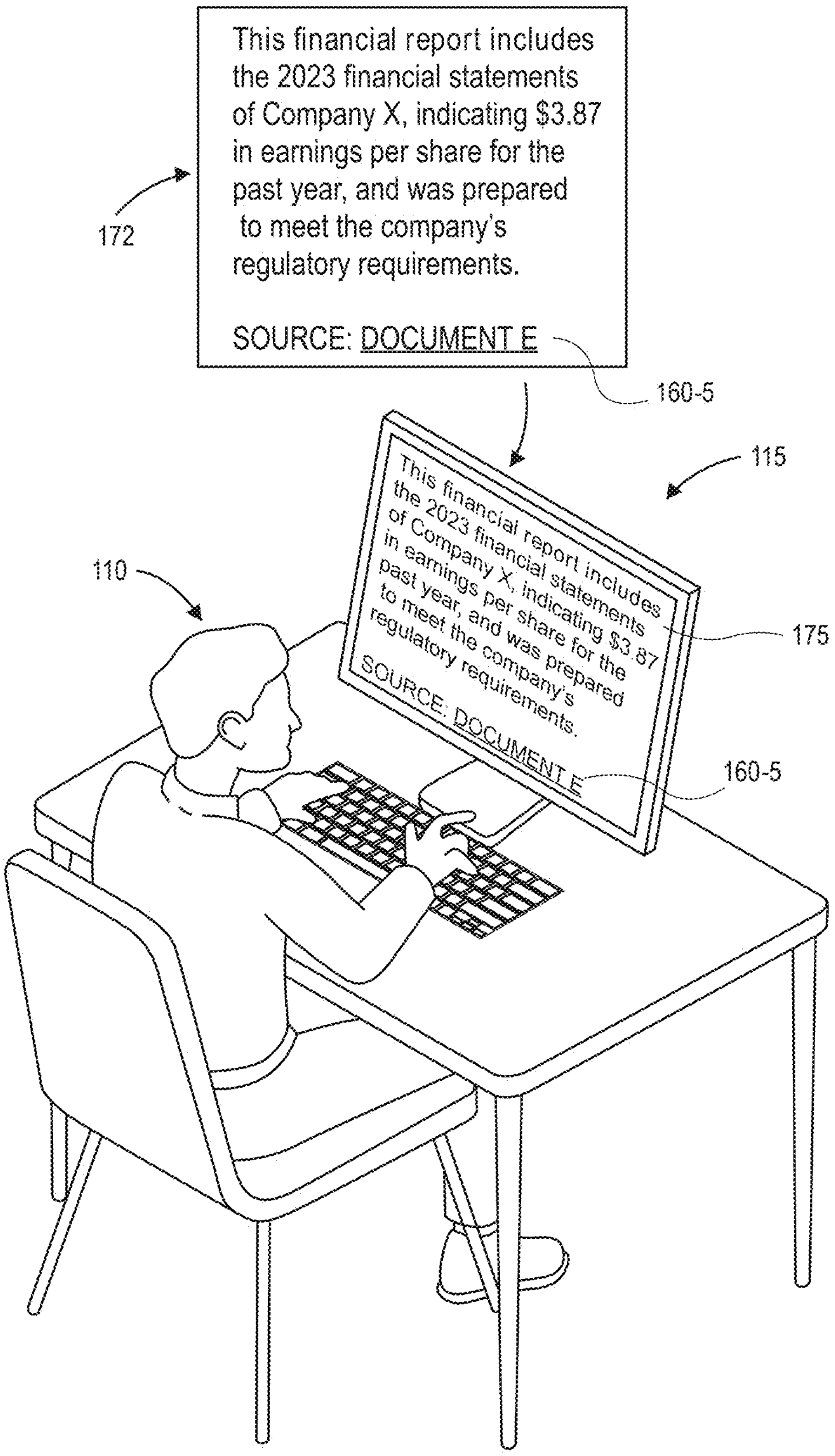

As is shown in FIG. 1G, the answer 172 and the source of the answer 172, viz., the document 160-5, are presented to the user 110 on the display 112 of the computer device 115. Subsequently, the user 110 may elect to provide an additional query, or take any other action with regard to the answer 172, such as to share the answer 172 and the document 160-5 with one or more personnel in management positions, or to store the answer 172 and the document 160-5 on the computer device 115 or in any other physical or virtual locations. In some implementations, as is further shown in FIG. 1G, in some implementations, the source of the answer 172 may be identified by one or more hyperlinked elements, and the user 110 may access the source of the answer 172 by selecting or otherwise interacting with such hyperlinked elements. The user 110 may further request one or more additional tasks as desired, such as to request "Please go through every number in this document and compare it to our source. Do all numbers tie out?" or "Please take this document and update the numbers with the latest numbers available in our source."

Accordingly, the systems and methods of the present disclosure directed to processing and retrieving documents, including but not limited to documents representing substantially large and unstructured multi-modal datasets. The systems and methods described herein may process and retrieve such documents in a manner that increases the efficiency and effectiveness of users who rely on such documents to answer questions or perform tasks, to prepare reports from such documents, or to derive insights from such documents. In some implementations, the systems and methods of the present disclosure are configured to convert free-form human descriptions into correct or appropriate structured query language (or "SQL") syntax, with links or references to sources of responsive date. The systems and methods of the present disclosure are particularly well-suited for processing and receiving financial documents.

In some implementations, a semantic-based indexing structure is utilized with state-of-the-art language models to query and answer questions, such as those in a finance domain, accurately and with cross-references to source documents. The systems and methods of the present disclosure may augment document indices with thematic elements that may automatically categorize a document both in context and in time, and facts or figures asserted therein may be accompanied by citations to documents or excerpts thereof. The systems and methods of the present disclosure may include an automatic framework featuring one or more discrete modules. Such modules may include, but need not be limited to, a data ingestion module, an automatic assistant, a modeling module, a database connector module and a citation module, among others. The data ingestion module may ingest documents of any file formats, e.g., word processing documents, electronic mail, presentations, spreadsheets or others, and of arbitrary length into chunks of not greater than a maximum predetermined length while preserving an integrity and order of the document. The data ingestion module may further augment such chunks with metadata such as time, themes, or other relevant information, as necessary, in order to improve a level of accuracy of results generated by a citation module.

The automatic assistant module may automatically search for relevant excerpts in a secure knowledge base to act as context, and may filter such excerpts or chunks based on temporal relevance using augmented metadata. A predetermined number of the greatest relevant chunks are selected, and may be augmented by additional documents or excerpts before being passed to the modeling module, which may include a language model, such as an LLM. An output generated by the modeling module may be processed by the citation module, which identifies a reference document or excerpt for each number or other quantitative data point referenced in the output generated by the modeling module. Upon identifying a reference document or excerpt, the database connector module generates and runs a query on documents accessible to the database connector module to verify that a response to the query matches the retrieved citation in the document identified as the source. If a mismatch is identified, a number or another quantitative data point identified in response to the query is extracted and presented to the user, to ensure that the source for the number is free of hallucinations and verified.

The systems and methods of the present disclosure may be utilized in connection with documents that are highly correlated, or which are subject to multiple iterations before finalization, making the temporal dimension to the understanding of such documents. By augmenting indexing techniques, and encoding time and thematic metadata into chunks, the retrieval of relevant and up-to-date information may be ensured. Moreover, by automatically verifying numbers or other quantitative data points against ground truth databases, e.g., using a text-to-SQL database connector module, reliability may be enhanced and risks of stale or erroneous data from static documents may be mitigated. Further, the combination of language modeling, domain-specific data augmentation and automatic database verification is particularly useful in the finance domain, where data integrity and access to most recent information are paramount for making informed decisions and complying with regulatory requirements.

The systems and methods of the present disclosure may include one or more artificial intelligence tools or other machine learning algorithms, systems or techniques that are configured to process and receive documents. Such tools may include, but need not be limited to, one or more query junction modules, query generator modules, query score generators, generative optimizers or output modules.

In some implementations, a query junction module may be configured to receive a free-form description of a question that a human user is attempting to answer or a task that the human user is attempting to perform. A query generator module may be configured to convert such a free-form description into an appropriate query, e.g., an SQL query, using one or more tables or references to data.

In some implementations, a quality score generator module may utilize one or more classifiers or other machine learning algorithms, systems or techniques that learn and predict a likelihood that a given query is optimal, or that the query requires further optimization. For example, in some implementations, a query score generator module may include a query classifier that is trained to generate, for each query, a query score, or a likelihood or probability that the query is optimal. Moreover, in some implementations, an attribution module may identify one or more features of a query that led to a determination that a query is suboptimal or optimal.

In some implementations, a generative optimizer module may include pairs of general models, e.g., a "student" model and a "teacher" model (or an "evaluator" model) that may operate in a loop on a query, thereby improving a query score calculated for the query. For example, in some implementations, a query optimizer may invoke a quality classifier and a quality score generator, and determine whether a quality score calculated for a query satisfies one or more system parameters. The generative optimizer module may halt operations when a predetermined number of iterations has been executed, or when a quality score calculated for a query exceeds a minimal parameter, e.g., one or more stopping criteria. If one or more stopping criteria are not met, a generative optimizer module may utilize any computed feature attributions or guardrails to calibrate a prompt, and to provide the query to the "student" model. A "teacher" model may evaluate and refine an output between iterations, e.g., by to correct any suboptimal aspects of a query at each iteration.

In some implementations, an output module may generate an optimized output including a dataset, e.g., tabular data, as well as a query in SQL, or insights regarding the dataset.

A query optimizer module may be agnostic to a choice of a database, a schema, or datasets of the database. The query optimizer may learn a notion of what constitutes an "optimal" query from a predetermined dataset, and may rely on machine learning algorithms, tools or techniques of a generative optimizer module to adapt a prompt in each iteration.

Figure 2:
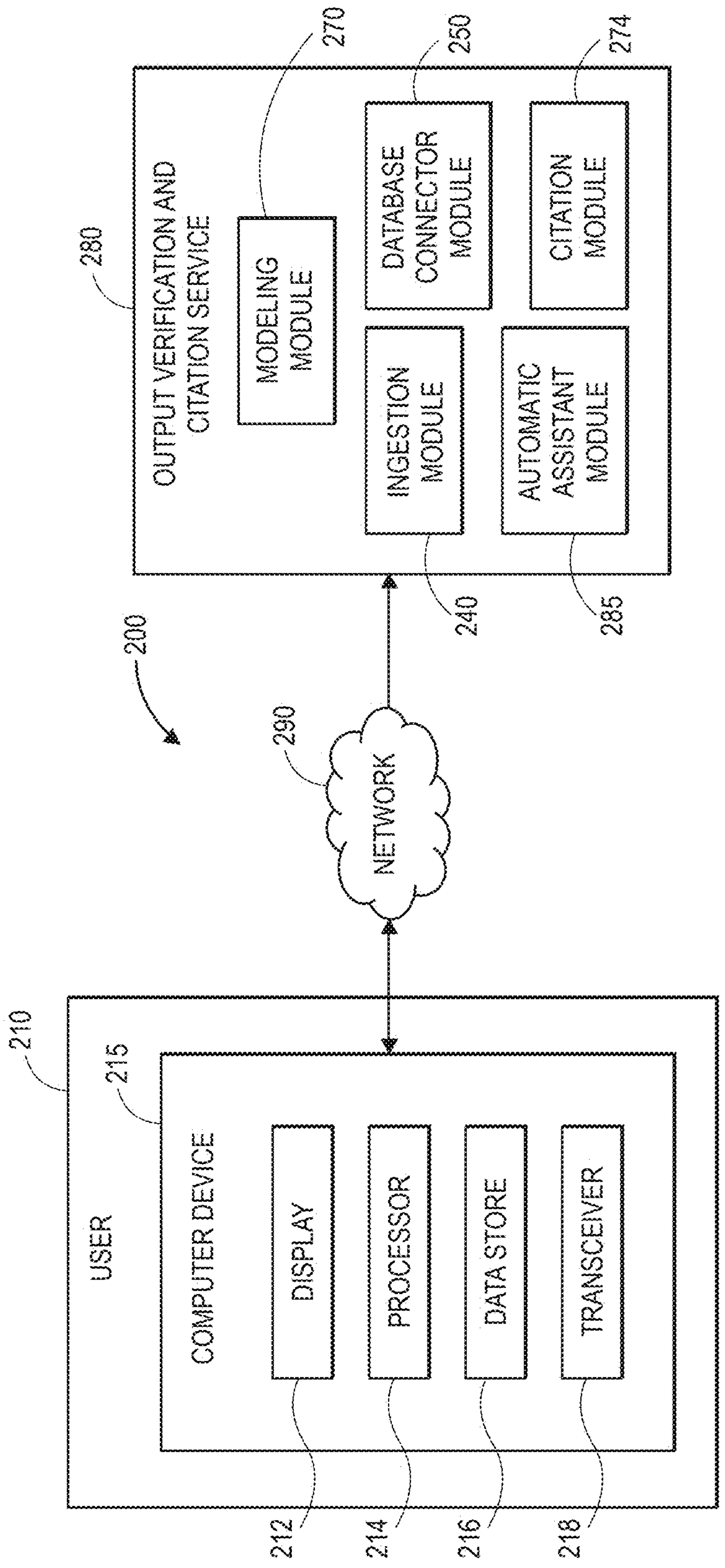
FIG. 2 is a block diagram of components of one system in accordance with implementations of the present disclosure.

Referring to FIG. 2, a block diagram of components of one system in accordance with implementations of the present disclosure is shown.

The system 200 shown in FIG. 2 includes a user 210 (e.g., a customer) and an output verification and citation service (or "service") 280 that are connected to one another over one or more networks 290, which may include the Internet in whole or in part.

The user 210 may be any individual or entity having access to one or more personal devices 215, e.g., general purpose or special purpose devices, for viewing content and/or communicating with other computer devices over the networks 290. For example, the computer device 215 may be any type of networked computer device (e.g., a personal digital assistant, a digital media player, a smartphone, a web pad, an electronic book reader, a desktop computer, a laptop computer or a tablet computer, as well as a television, a wearable computer device such as a pair of augmented reality glasses or a wristwatch, or a computer device that may be incorporated into one or more vehicles or appliances) or any other like machine that may operate or access one or more software applications, that may be configured to render content on one or more displays or to receive interactions with such content.

The computer device 215 may include a display 212, a processor 214, a data store 216 and/or a transceiver 218. The display 212 may be a monitor or any other like machine having a screen for viewing rendered video content. For example, the display 212 may incorporate any number of active or passive display technologies or systems, including but not limited to electronic ink, liquid crystal displays (or "LCD"), light-emitting diode (or "LED") or organic light-emitting diode (or "OLED") displays, plasma displays, electrophoretic displays, image projectors, or other display mechanisms. The display 212 may be configured to receive content from any number of sources via one or more wired or wireless connections, including but not limited to the user 210 over the networks 290.

Those of ordinary skill in the pertinent arts will recognize that the computer device 215 may include any number of hardware components or operate any number of software applications for receiving and rendering content from any source, including one or more processors 214, data stores 216 and/or transceivers 218. For example, the processors 214 may be configured to operate one or more software applications, e.g., a browser, a viewing application operating one or more codecs, or a shopping application, and render content on the display 212. The processors 214 may execute one or more computer-based instructions that may be stored on the data store 216, along with one or more video files or operating programs or instructions. The transceivers 218 may be configured to communicate over one or more of the networks 290, such as by receiving and interpreting broadcast signals, cable television signals, computer signals, cellular telephone signals or any other type or form of signals, and responding in kind with any number of corresponding or reciprocal signals.

Moreover, those of ordinary skill in the pertinent arts will further recognize that, alternatively, in some implementations, the computer device 215 need not be associated with the user 210. For example, the computer device 215 may be provided in a public place, and associated with any number of other users, in addition to the user 210.

In some implementations, the computer device 215 may be programmed or configured to train or operate one or more machine learning or artificial intelligence applications, systems or techniques. For example, the computer device 215 may be programmed to execute one or more transformer networks (e.g., bidirectional encoder representations from transformers, or "BERT"), artificial neural networks (e.g., a deep neural network, or a convolutional neural network), generative adversarial networks (or "GAN"), nearest neighbor methods or analyses, support vector machines, Bayes classifiers, logistic regression techniques, decision trees, Random Forest algorithms, factorization methods or techniques, clustering analyses or techniques, similarity analyses or techniques, or others.

Alternatively, those of ordinary skill in the pertinent arts will recognize that the user 210 may own, operate or have access to systems other than the computer device 215, e.g., one or more servers having any number of processor units, hard drives or other data stores, or communications equipment for accessing or communicating with the service 280 over the one or more networks 290.

As is shown in FIG. 2, the service 280 includes an ingestion module 240, a database connector module, a modeling module 270, a citation module 274 and an automatic assistant module 285. Each of the various modules of the service 280 may be executed by one or more physical or virtual machines in any type or form of computing environment, e.g., a cloud provider network. The service 280 may be employed as one or more methods, apparatuses, systems, non-transitory readable media, or in any other manner.

The ingestion module 240 be configured to receive documents or other files in any format, e.g., word processing documents, electronic mail, presentations, spreadsheets or others, of any lengths and process those documents or other files into chunks of not greater than a maximum predetermined length while preserving an integrity and order of the respective documents or files. The ingestion module 240 may further augment such chunks with metadata such as time, themes, or other relevant information, as necessary, in order to improve a level of accuracy of results generated by the citation module 274.

The automatic assistant module 285 may be configured to search for one or more relevant documents or excerpts (e.g., chunks) of a knowledge base, e.g., for use as context in connection with a query. For example, in some implementations, the automatic assistant module 285 may convert a question or a query, or documents received in connection with the request or the query, to one or more embeddings, and to compare such embeddings to contents of a knowledge base to identify documents as similar to the question or the query. Retrieved documents, excerpts or chunks may be filtered or ranked based on temporal relevance to the question or query, and a predetermined number of most relevant documents, excerpts or chunks may be identified accordingly. In some implementations, where the automatic assistant module 285 identifies a plurality of documents for use as context in connection with a question or a query, additional documents may be optionally identified by one or more experts.

The database connector module 250 may be a specialized database or storage system designed to efficiently store, manage, and perform operations on embeddings, or arrays of numbers that can represent various types of data, including but not limited to spatial coordinates, features extracted from images or text, or other data, and used in search and recommendation systems. For example, the database connector module 250 may perform one or more similarity analyses, such as by providing embeddings as inputs to a non-parametric classifier, e.g., a k-nearest neighbor algorithm, that calculates distances between data points corresponding to respective embeddings, and may identify a predetermined number of documents, or chunks or excerpts of documents, that are most similar to an embedding generated based on a question received from the user 210, or the question and any additional documents received from the user 210. In some implementations, the database connector module 250, or another module, may be further configured to augment a question received from the user 210 to include additional information, data or metadata regarding the question or the user 210, including but not limited to temporal information, a synopsis of the question, a theme of question, or any other information or data. Subsequently, the database connector module 250, or another module, may generate another embedding or other vector based on the question, as augmented by the metadata, and to rank a set of documents, or chunks or excerpts of documents that were previously identified based on an embedding generated from the question received from the user 210.

For example, the database connector module 250 or another module may perform a similarity analysis, such as a cosine similarity analysis, between an embedding generated based on the question received from the user 210 and any additional metadata and the embeddings corresponding to each of the documents of the set. Such documents may be ranked or scored based on the similarity between the embedding generated based on the question received from the user 510 and any additional metadata and the embeddings corresponding to respective documents of the set, according to any type or form of similarity analysis or in any other manner.

The modeling module 270 may be configured to execute one or more language models, e.g., LLMs, on documents, excerpts or chunks identified as most relevant to a question or a query, and to generate outputs consistent with a response to the question or query. For example, the modeling module 270 may be configured to execute LLMs or other algorithms, systems or techniques that are programmed or configured to understand and generate human language, based on any number of techniques such as natural language processing (or "NLP"), or natural language understanding (or "NLU").

Language models of the modeling module 270 may take any form and may be utilized to perform any tasks or functions, such as to analyze text for sentiments, to answer questions, to engage in conversation, to generate, edit or understand text-based content or passages of computer code, to label parts of speech, to summarize text, to translate text into different languages, or to execute or perform any tasks or functions. For example, the modeling module 270 may also divide text into units, sets or "tokens," which may be words, portions of words, or characters. The language models of the modeling module 270 may be configured to predict one or more tokens as necessary, using previously generated tokens to provide context, and to generate relevant text based on such predictions.

In some implementations, the language models of the modeling module 270 may include transformer architectures that rely on one or more artificial neural networks, as well as attention mechanisms, which enable the language models to evaluate different portions (e.g., tokens) of text received as inputs when generating outputs, and to consider the importance of the respective words as well as contexts in which such words are used.

For example, language models of the modeling module 270 may be programmed or configured to select a next word in a sentence, such as by causal language modeling, or to identify one or more omitted words in a sentence, such as by masked language modeling, or by backpropagation, optimization, or other techniques. The language models of the modeling module 270 may also be fine-tuned based on particular datasets, e.g., to adapt the models to one or more specific tasks or domains, such as for one or more sentiment analyses or other purposes.

The citation module 274 may be configured to identify reference documents, excerpts or chunks corresponding to numbers or other quantitative data points represented in outputs generated by the modeling module 270. In some implementations, the citation module 274 may execute one or more regular expression (or "RegEx") functions on documents of a knowledge base based on such outputs. Upon identifying a document, an excerpt or a chunk representing a source for an answer embodied in an output, the citation module 274 may initiate the document connector module 250 to generate an appropriate SQL query, run the SQL query on documents of the knowledge base, and identify a response to the SQL query based on contents of the knowledge base. A number (or another quantitative data point) in a response to the SQL query may represent a ground truth that may be compared to a number (or another quantitative data point) in a response generated by the citation module 274. Where a mismatch is identified between the ground truth number and the number in the response generated by the citation module 274, the ground truth number is presented to the user 210, thereby ensuring that each and every quantitative data point included in a response returned to the user 210 has been automatically verified.

Although the service 280 is shown as having five discrete modules, any of the applications, tasks or functions described herein as being utilized or performed by any one of the ingestion module 240, the database connector module 250, the modeling module 270, the citation module 274 or the automatic assistant module 285 may be utilized or performed by any other of the ingestion module 240, the database connector module 250, the modeling module 270, the citation module 274 or the automatic assistant module 285, alone or in combination with one or more other modules. Furthermore, although the system 200 shown in FIG. 2 shows boxes for one user 210 having one computer device 215, and one service 280, those of ordinary skill in the pertinent arts will recognize that any number of users 210 having any number of computer devices 215 and any number of services 280 may be considered in accordance with the present disclosure.

The networks 290 may be any wired network, wireless network, or combination thereof, and may comprise the Internet, intranets, broadcast networks, cellular television networks, cellular telephone networks, satellite networks, or any other networks, in whole or in part. In addition, the network 290 may be a personal area network, local area network, wide area network, cable network, satellite network, cellular telephone network, or combination thereof, in whole or in part. The network 290 may also be a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer device 215 and the service 280, and associated components, may use any web-enabled or Internet applications or features, or any other client-server applications or features including E-mail or other messaging techniques, to connect to the networks 290, or to communicate with one another. For example, the computer device 215 and the service 280 may be configured to transmit information or data in the form of synchronous or asynchronous messages to one another in real time or in near-real time, or in one or more offline processes, via the networks 290. Those of ordinary skill in the pertinent art would recognize that the computer device 215 and the service 280 may operate any of a number of computing devices that are capable of communicating over the networks 290. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the computer device 215 and the service 280, or to any other computers or control systems utilized by the user 210 or the service 280, and having sequences of instructions which, when executed by a processor (e.g., a central processing unit, or "CPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
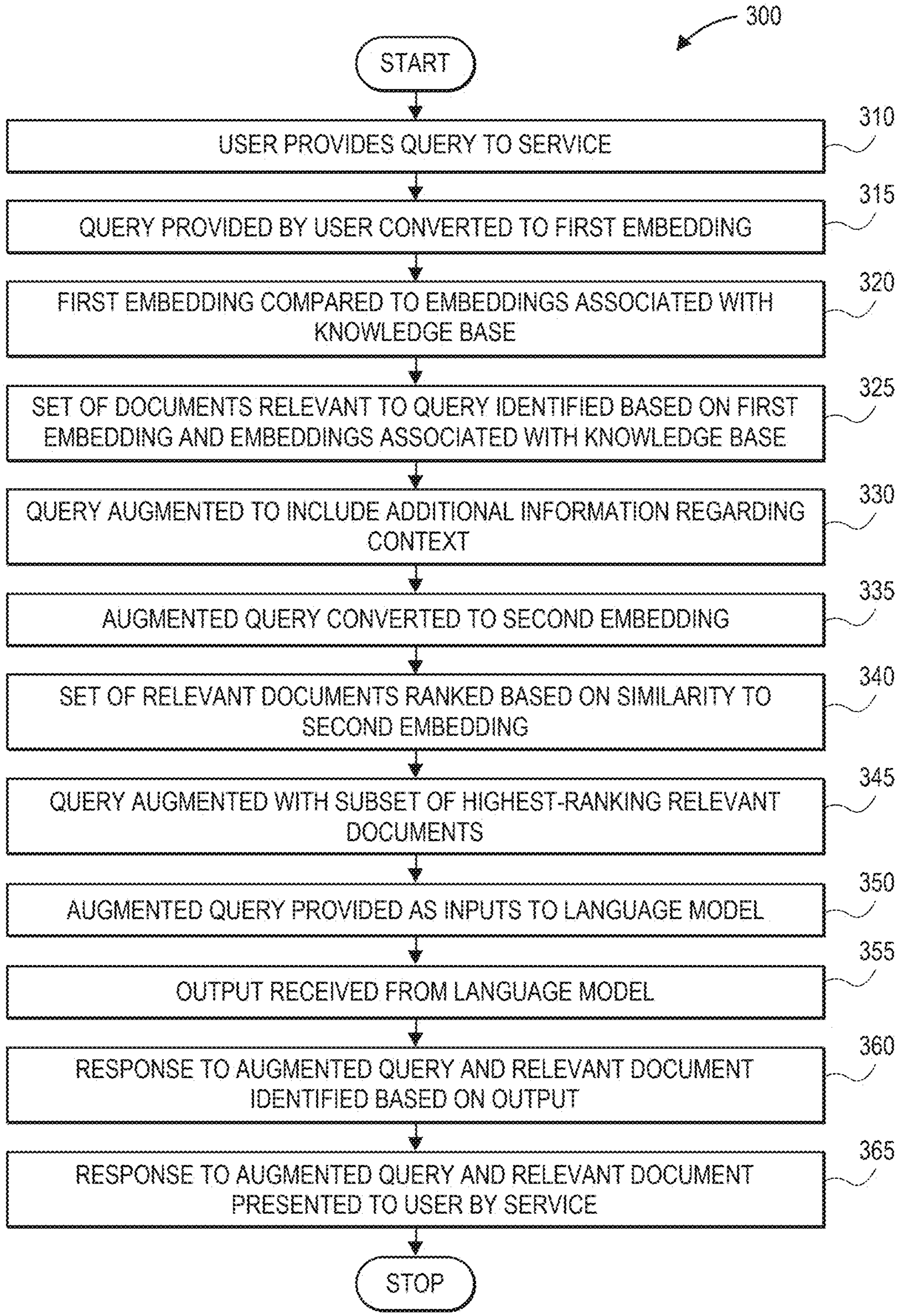
FIG. 3 is a flow chart of one process in accordance with implementations of the present disclosure.

Referring to FIG. 3, a flow chart 300 of one process in accordance with implementations of the present disclosure is shown. At box 310, a user provides a query to a service, e.g., a verification and citation service, which may be operated or maintained by one or more services of a cloud provider network. The query provided by the user may take the form of a question or request, or any other form. For example, the user may provide a text-based question or a request in his or her own words, including a generic question, such as, "what is month-end close?" or "is month-end close a planning activity or an accounting activity?" Alternatively, the user may provide one or more documents and a question or a request relating to the documents such as, "please summarize the document by reading its contents and prepare a letter in response to the document," or a question or a request relating to an existing knowledge base, such as "please tell me our second quarter operating margins and list the year-over-year margin drivers in descending order." A knowledge base may be a centralized repository of information used by an artificial intelligence system to make decisions, determine and understand contexts, or support reasoning processes. Information of a knowledge base may be structured in a way that computers can utilize the information to solve complex problems, answer questions, or facilitate interactions with users. The knowledge base may include facts, rules, relationships, or constraints, or other information or data, and may enable an artificial intelligence system to perform tasks that require an understanding of real-world information or domain-specific knowledge.

In some implementations, the user may enter a search query or another question or request to a query generator module (or another module) via a general-purpose application such as a browser operating on a computer device or system, via an application dedicated to receiving such queries operating on the computer device or system, or in any other manner. For example, in some implementations, the user may type one or more terms of the search query into an input field, a text box or another feature provided on a page or another interface by way of a physical or virtual keyboard, e.g., on a touchscreen display. Alternatively, or additionally, the user may provide terms of the search query using one or more utterances of spoken or sung words, and such terms may be interpreted by capturing and interpreting acoustic data representing the one or more words. In some other implementations, the user may select one or more terms by way of a drop-down menu or any other interactive feature. The query generator module may convert the query or other question to a free-form description of what the user is attempting to accomplish to a correct SQL query using authorized tables, or interact with the user, as needed, e.g., to request additional context or clarification in a series of questions and answers, such as "did you need data for a particular year?" or "are you looking for a latest snapshot?"

At box 315, the query received by the processing system from the user is converted to a first embedding. For example, in some implementations, a question or a request may be provided as an input to a transformer or another machine learning algorithm, system or technique that is trained to generate embeddings or vectors representative of the question or request. Such embeddings or vectors may have any number of values or dimensions, and may be stored on or by a server or another computer device or system.

At box 320, the first embedding generated at box 315 is compared to embeddings or other vectors that are associated with documents of a knowledge base and stored in a data store, e.g., a vector store. In some implementations, a plurality of documents may be uploaded or otherwise provided to a processing system, and the documents may be divided into chunks and supplemented with metadata before being converted to embeddings, e.g., numerical vectors in high-dimensional spaces, with each of the dimensions representing a different aspect of a meaning or a context. The embeddings generated from the documents of the knowledge base may then be stored in the data store, in association with the documents from which each of the embeddings was generated.

In some implementations, a database connector module (or another module or system) of the service having access to one or more sets of embeddings and documents stored thereon may be a specialized database or storage system designed to efficiently store, manage, and perform operations on embeddings or other vectors and documents. Such embeddings or other vectors may be arrays of numbers which can represent various types of data, e.g., features extracted from images or text for machine learning purposes, spatial coordinates, or embeddings used in search and recommendation systems. The database connector module may be configured to enable high-performance similarity search operations, which are crucial for applications involving nearest neighbor searches, recommendation systems, and machine learning model inference, or any other operations.

At box 325, a set of documents relevant to the query is identified based on the first embedding and the embeddings associated with the knowledge base, such as by a similarity analysis of such embeddings. For example, in some implementations, a similarity analysis such as a k-nearest neighbors analysis may be performed by providing the first embedding and the embeddings of the data store as inputs to a k-nearest neighbor algorithm or another non-parametric classifier that calculates distances between data points corresponding to the first embedding generated based on the query and data points corresponding to each of the embeddings of the data store. The k-nearest neighbor algorithm may identify nearest neighbors to a given query point, e.g., one or more points corresponding to the first embedding, and the "k" value in the k-nearest neighbor algorithm determines how many neighbors will be evaluated in order to determine a classification of the query point. A similarity analysis between data points of other embeddings of the data store and the first embedding may be calculated according to any measures or standards, such as a Canberra distance, a Chebychev distance, a Chi-square distance, a cosine distance, a Euclidean distance, a Hamming distance, a Jaccard distance, a Mahalanobis distance, a Manhattan distance, a Minkowski distance, a Sorensen-Dice distance, a Pearson correlation, a Spearman correlation, or any other score or metric. Alternatively, the set of documents relevant to the query may be identified in any other manner and by any other analyses or standards.

At box 330, the query is augmented to include additional information regarding a context of the query, including but not limited to temporal information regarding the query, e.g., or one or more relevant times or other attributes or features associated with the query, as well as any synopses, themes or other information or data regarding the query. In some implementations, documents including the additional information may be identified automatically, e.g., by an automatic assistant module. Alternatively, where the query was provided at box 310 along with one or more documents, the query may be augmented to include semantic information regarding the documents, as well as summaries of the documents, independent of or in addition to temporal information.

At box 335, the augmented query is converted to a second embedding. In some implementations, the query and the additional information regarding the context may be provided as an input to a transformer or another machine learning algorithm, system or technique that is trained to generate embeddings or vectors representative of the query. Such embeddings or vectors may have any number of values or dimensions, and may be stored on or by a server or another computer device or system. In some implementations, the second embedding may be in a different vector space than the first embedding. In some implementations, the second embedding may be in the same vector space as the first embedding.

At box 340, the set of relevant documents is ranked based on their respective similarity to the second embedding. For example, the embeddings or other vectors corresponding to each of the set of relevant documents identified at box 325 may be compared to the second embedding, e.g., according to a similarity measure such as a cosine similarity measure, a dot-product similarity measure, or any other technique.

At box 345, the query is augmented with at least a subset of the highest-ranking relevant documents. For example, where the query includes one or more sets of words, such words and any number of words identified from one or more of the highest-ranking relevant documents may be aggregated or concatenated. In some implementations, a predetermined number of the relevant documents ranked according to their similarity to the second embedding may be selected. The predetermined number may include one, two, three or any other number of the ranked documents.

At box 350, the augmented query is provided as one or more inputs to a language model, such as an LLM, one or more natural language processing (or "NLP"), or natural language understanding (or "NLU") models, or other models. For example, the augmented query may be provided to a modeling module or other feature including a pre-trained transformer model having one or more encoders or decoders, one or more deep learning models such as convolutional neural networks or recurrent neural networks, or any other models. In some implementations, the language model may include any number of transformers or other machine learning algorithms, systems or techniques, and may be trained using substantially large datasets to recognize, summarize, translate, predict, or generate content in the form of relevant text or language. The language model may have been trained by any number of corpora of documents or other data that do not include any documents received from the user, or any of the set of documents identified as relevant to the query.

At box 355, an output is received from the language model in response to the inputs.

At box 360, a response to the query and one of the relevant documents identified as a source for the response are identified based on the output. The source document may be identified based on outputs received from language models, e.g., according to a retrieval-augmented generation (or "RAG") technique. Additionally, in some implementations, one of the relevant documents may be identified as a source for the response according to a regular expression (or "RegEx") function, which may be executed by a citation module or any other element or feature of the service, or according to any other process or procedure.

At box 365, the response to the query and a source document are presented to the user by the service, and the process ends. The response to the query and the source document may be presented to the user in any manner, such as by causing a display of text including the response, and at least a portion of the source document, on a display of a computer device operated by the user. Alternatively, or additionally, the response to the query may be displayed along with a hyperlink or another reference to the source document. The response and the source document may also be transmitted to a computer device or system operated by the user, e.g., in an electronic mail message or in any other type or form of electronic message.

In some implementations, once a citation module identifies a reference document or an excerpt as a source for a number (or another quantitative data point) identified in the response to the query identified at box 360, a database connector module or another feature, such as a text-to-SQL engine, may automatically generate an appropriate SQL query, run the SQL query on a ground truth database including one or more of the plurality of documents, and determine a correct response to the SQL query from the ground truth database. The database connector module may then compare a number (or another quantitative data point) identified in the response to the SQL query against the number identified in the response to determine whether a mismatch is present. If a mismatch between the numbers is identified, the number extracted from the ground truth database is presented to the user, thereby ensuring that every number included in a response finds appropriate support in a document and is accompanied by a verified citation to the document, and guarding against hallucinations by the language model.

Figure 4:
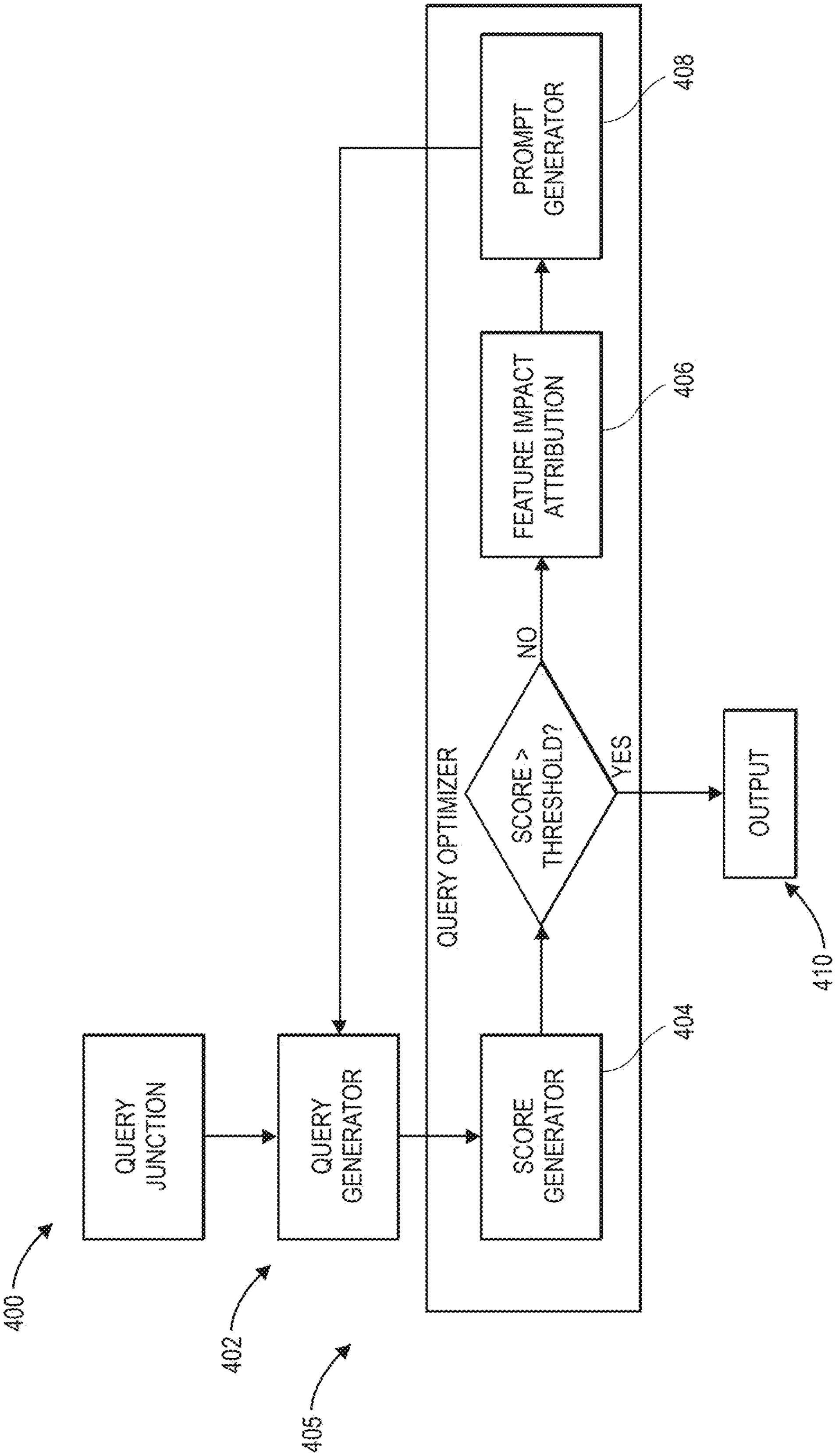
FIG. 4 is a diagram of components of one system in accordance with implementations of the present disclosure.

Referring to FIG. 4, a diagram of components of one system in accordance with implementations of the present disclosure is shown. As is shown in FIG. 4, the system includes a query junction module 400 in communication with a query generator module 402, as well as a query optimizer module 405 that generates an output 410. The query optimizer module 405 further includes a quality score generator module 404, a feature impact attribution module 406 and a prompt generator module 408.

The query junction module 400 may be configured to receive a question or a request from a human user or a machine, or a free-form description of a question or a request that the human user is attempting to answer or a task that the human user is attempting to perform. The query junction module 400 may also be configured to permit a human user to edit a question, or to provide insights regarding the question.

The query generator module 402 may be configured to convert a free-form description received from a human user or a machine into an appropriate query, e.g., an SQL query, using one or more tables or references to data. In some implementations, the query generator module 402 may interact with one or more human users to obtain further context or clarification, such as by providing the users with a sequence of questions and answers, or by providing a drop-down menu or other features enabling the users to further specify their respective context.

The query optimizer 405 may be configured to calculate a quality score for a query, e.g., by the quality score generator module 404, which may utilize a query classifier or other machine learning algorithms, systems or techniques to learn and predict a likelihood that a given query is optimal, or that the query requires further optimization. For example, in some implementations, the quality score generator module 404 may calculate a query score, or a likelihood or probability that the query is optimal, for each query. Moreover, in some implementations, the feature impact attribution module 406 may identify one or more features of a query that led to a determination that a query is suboptimal or optimal.

In some implementations, the query optimizer module 405 may include pairs of general models, e.g., a "student" model and a "teacher" model (or an "evaluator" model) that may operate in a loop on a query, thereby improving a query score calculated for the query. For example, in some implementations, the query optimizer module 405 may invoke a query classifier 402 and the quality score generator module 404, to determine whether a quality score calculated for a query satisfies one or more system parameters. The query optimizer module 405 may halt operations when a quality score calculated for a query exceeds a minimal parameter, e.g., one or more thresholds or other stopping criteria. If any stopping criteria are not met, the query optimizer module 405 may utilize any computed feature attributions or guardrails to calibrate a prompt, and to provide the query to the "student" model. A "teacher" model may evaluate and refine an output between iterations, e.g., by to correct any suboptimal aspects of a query at each iteration.

For example, in some implementations, when a human user provides a question, the question may be provided to one or more human assistants, who may evaluate and assess the question, or otherwise determine whether any additional information is required from the user that provided the question, and augment the question with any additional information or data. The assistants may then provide the augmented question to the query generator module 405, which may include one or more large language models that are configured to generate a query in SQL syntax based on the question. If the query is not executable, the query may be returned to the human user, who may be prompted or requested to provide a different question. If the query is determined to be executable, however, the query may be returned to the query optimizer module 405.

In some implementations, the output module 410 may generate an optimized output including a dataset, e.g., tabular data, as well as a query in SQL, or insights regarding the dataset, once a quality score calculated for the query is determined to exceed a predetermined threshold. Alternatively, or additionally, a stopping criteria may include a predetermined number of iterations of evaluations or refinements of a query have been performed, and the query optimizer module 405 may halt operations or instruct the output module 410 to generate an optimized output once a predetermined number of iterations have been performed.

Figure 5:
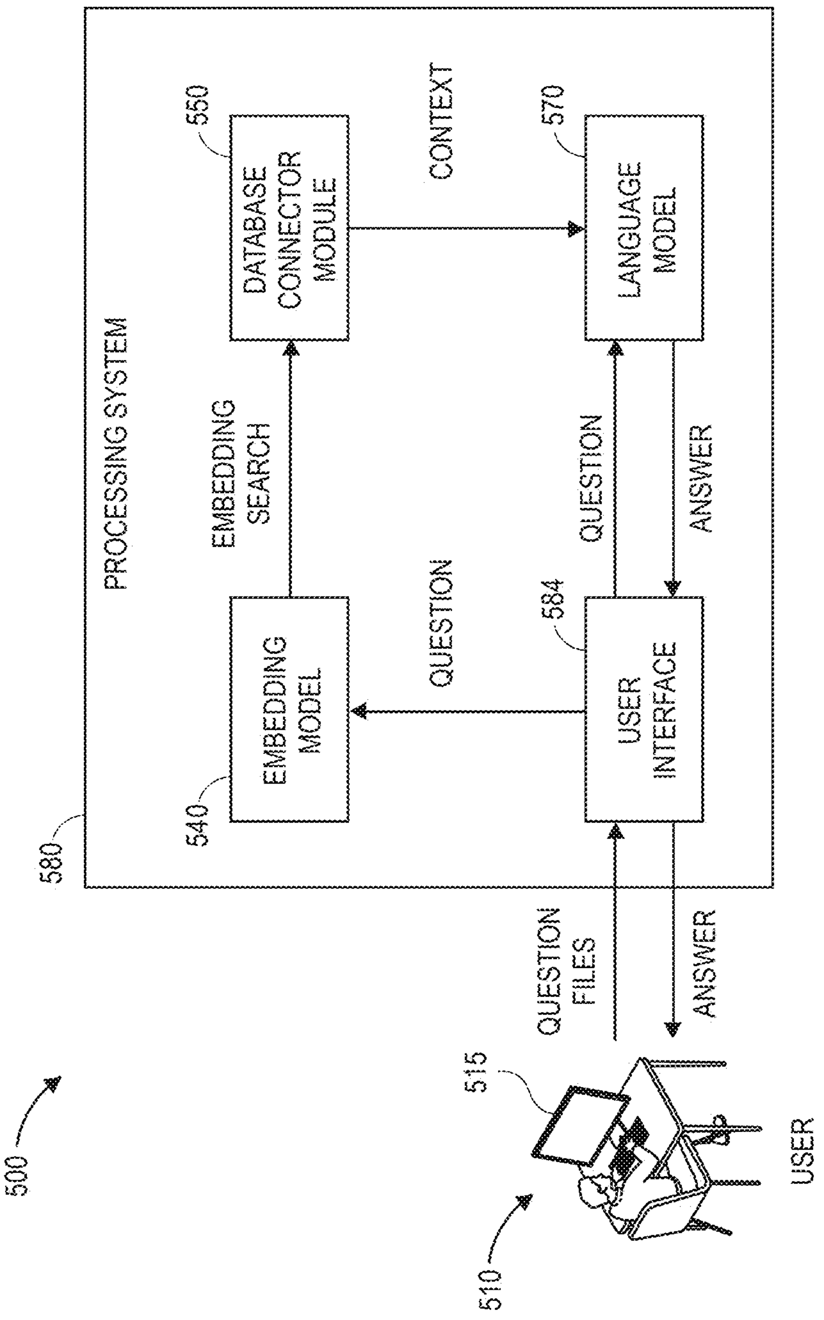
FIG. 5 is a diagram of components of one system in accordance with implementations of the present disclosure.

Referring to FIG. 5, a diagram of components of one system in accordance with implementations of the present disclosure are shown. Except where otherwise noted, reference numerals preceded by the number "5" shown in FIG. 5 refer to elements that are similar to elements having reference numerals preceded by the number "2" shown in FIG. 2 or by the number "1" shown in FIGS. 1A through 1G.

As is shown in FIG. 5, the system 500 includes a user 510 operating a computer device 515 in communication with a user interface 584 or another feature of a processing system 580 that is configured to receive information from the user 510 or present information to the user 510 by way of the computer device 515. In particular, as is shown in FIG. 5, the user 510 provides a question to the user interface 584, and the question may be accompanied by one or more documents in any format and of any length. The processing system 580 may convert the documents received from the user 510 into one or more chunks of not more than a predetermined length, while preserving the integrity and order of respective sentences or other passages of the respective documents. The processing system 580 may augment chunks derived from documents received from the user 510 with metadata, such as time, financial information or themes, or other relevant information, to improve the accuracy of the models and the experience of the user 510.

As is further shown in FIG. 5, the processing system 580 provides the question and any files or documents received from the user 510 to an embedding model 540, which may be configured to convert the question or documents to embeddings, or numerical vectors in high-dimensional spaces, with each of the dimensions representing a different aspect of a meaning or a context. Embeddings generated by the embedding model 540 may be stored in a database connector module (e.g., a vector store) 550, in association with the question or the documents from which the embeddings were generated. The database connector module 550 may include a specialized database or storage system designed to efficiently store, manage, and perform operations on embeddings, or arrays of numbers that can represent various types of data, including but not limited to spatial coordinates, features extracted from images or text, or other data, and used in search and recommendation systems.

The processing system 580 may further provide an embedding generated based on a question received from the user 510, or based on the question and any documents received from the user 510, to the database connector module 550 having any number of embeddings or other vectors stored thereon. The database connector module 550 may be configured to perform one or more similarity search operations, or to compare embeddings or other vectors according to any standard.

For example, in some implementations, the processing system 580 may be configured to perform one or more similarity analyses on embeddings or other vectors generated based on documents of a knowledge base and an embedding generated based on a question received from the user 510, or the question and any additional documents received from the user 510. For example, the database connector module 550 may perform one or more k-nearest neighbors analysis, such as by providing the embeddings as inputs to a non-parametric classifier, e.g., a k-nearest neighbor algorithm, that calculates distances between data points corresponding to the embedding generated based on the question received from the user 510, or the question and any additional documents received from the user 510, and data points corresponding to each of the embeddings of the database connector module 550. Accordingly, the database connector module 550 may identify a predetermined number of documents, or chunks or excerpts of documents, that are most similar to the embedding generated based on the question received from the user 510, or the question and any additional documents received from the user 510.

In some implementations, the database connector module 550, or another module, may be further configured to augment the question received from the user 510 to include additional information, data or metadata regarding the question or the user 510, including but not limited to temporal information, a synopsis of the question, a theme of question, or any other information or data. Subsequently, the database connector module 550, or another module, may generate another embedding or other vector based on the question, as augmented by the metadata, and to rank a set of documents, or chunks or excerpts of documents that were previously identified based on an embedding generated from the question received from the user 510.

For example, the database connector module 550 or another module may perform a similarity analysis, such as a cosine similarity analysis, between an embedding generated based on the question received from the user 510 and any additional metadata and the embeddings corresponding to each of the documents of the set. Such documents may be ranked or scored based on the similarity between the embedding generated based on the question received from the user 510 and any additional metadata and the embeddings corresponding to respective documents of the set, according to any type or form of similarity analysis or in any other manner.

As is further shown in FIG. 5, the question received from the user 510 may be concatenated or otherwise combined with portions of one or more of the highest-ranking documents and provided as an input to a language model 570, e.g., a large language model (or "LLM"), that is provided to understand inputs received from a user, and generate responses to such inputs, and effectively carry on a conversation with the user in a natural language. In such implementations, the language model 570 may be one or more natural language processing (or "NLP"), natural language understanding (or "NLU") models, or other language models including a pre-trained transformer model having one or more encoders or decoders, one or more deep learning models such as convolutional neural networks or recurrent neural networks, or any other models. The language model 570 may be configured to return an answer, or another conversational response, in reply to a query including the question, and to enable effective communication during a conversational experience. In some implementations, the language model 570 may be configured to return an answer, e.g., a structure-free textual response to the question, as well as a source (e.g., an identifier of a document, an excerpt or a chunk from which the answer was derived), according to one or more retrieval-augmented generation (or "RAG") techniques. The answer and the source of the answer may be presented to the user 510 by way of the user interface 584, or in any other manner.

Alternatively, or additionally, the user 510 or another human may participate in the generation of embeddings based on a question or the question and accompanying documents, the identification of documents within a knowledge base, or any other aspect of the operations described herein, to the extent that such participation is practicable. For example, the user 510 or another human may provide one or more files or documents that he or she believes to be most relevant or appropriate based on the question and may cause such files or documents to be provided to the embedding model 540 independently or along with the question provided by the user 510, and alternatively any files or documents received from the user 510. The user 510 or another human may also intervene or cooperate in the generation of queries or prompts to the language model 570, or the interpretation of inputs to be provided to the language model 570. The user 510 or another human may further provide feedback regarding an answer generated by the language model 570, such as by confirming a source of the answer identified by the language model 570 includes an exact match to the answer, or whether the source does not include an exact match to the answer, before returning the answer generated by the language model 570, or a different answer, to the computer device 515 of the user 510. Alternatively, or additionally, the user 510 or another human may evaluate the answer and determine whether a risk of hallucination exists, before returning the answer generated by the language model 570, or a different answer, to the computer device 515 of the user 510.

Figure 6A:
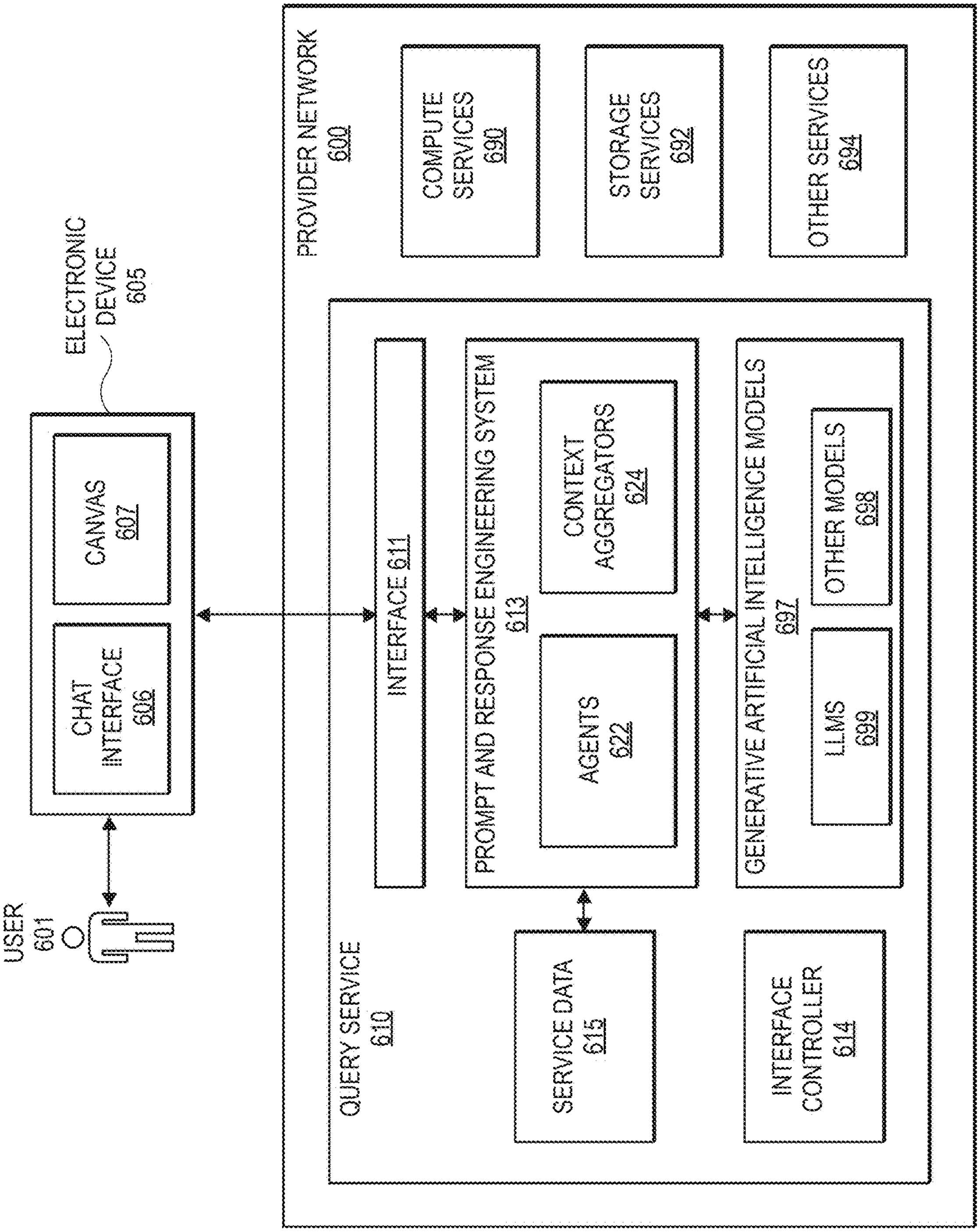
FIGS. 6A and 6B are views of a service and environment in accordance with implementations of the present disclosure.
Figure 6B:
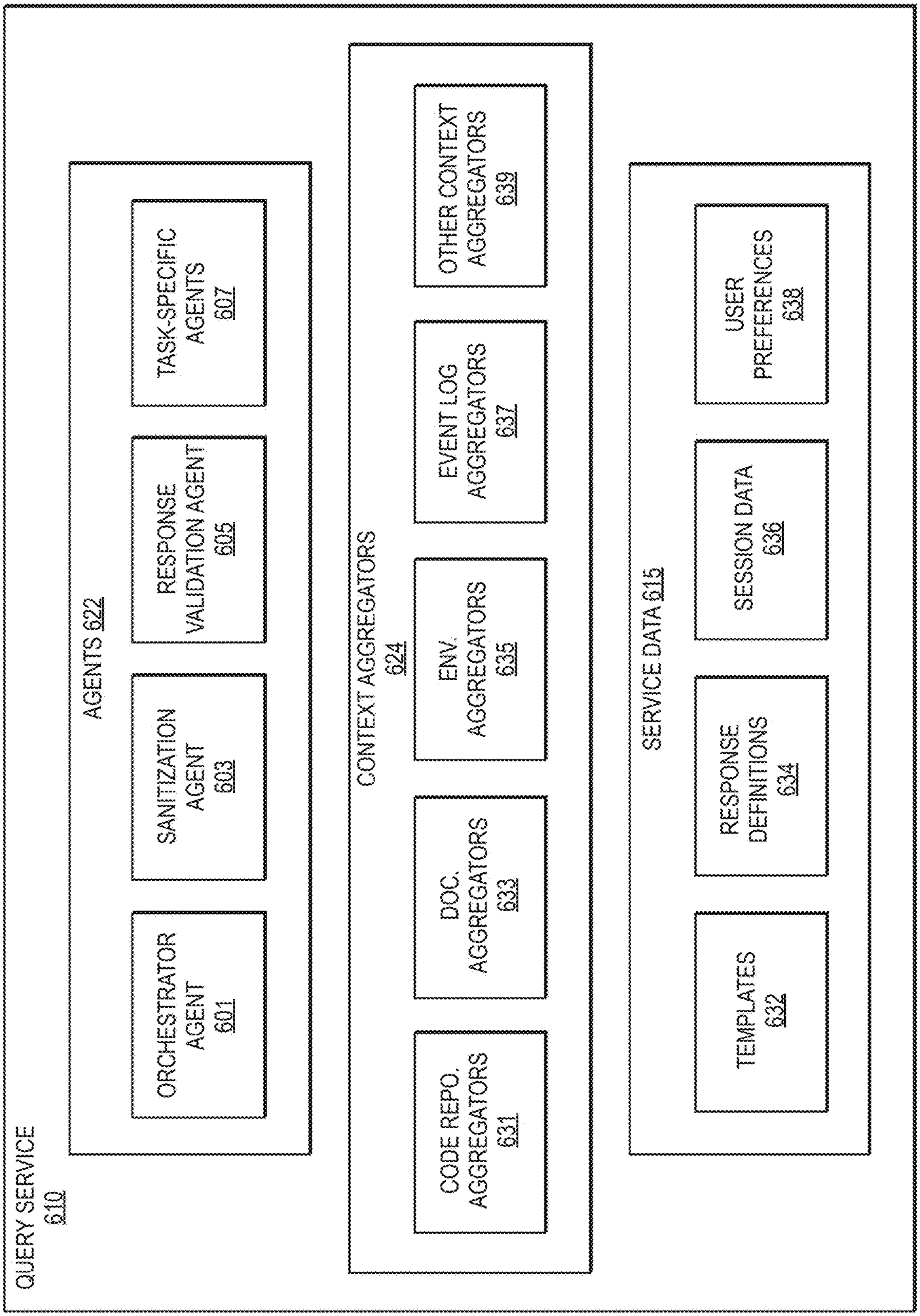

Referring to FIGS. 6A and 6B, views of a service and environment in accordance with implementations of the present disclosure are shown. As is shown in FIG. 6A, a high-level overview of a query service 610 (or a "query output validation and citation service," an "output validation service," a "validation and citation service," or like terms)

that operates in an environment, such as a provider network 600, according to some implementations of the present disclosure. The query service 610 acts as an intermediary that interfaces with generative artificial intelligence (or "GAI") models 697, such as language models, on behalf of clients. One or more of the models may be a language model that probabilistically generates natural language. For example, a language model may predict that the word "said" is more likely to appear after the word "he" than after the word "dolphin." One type of language model is a large language model 699 (or "LLM") that is developed with a neural network architecture often including millions or even billions of model parameters, and may be trained using datasets of documents that determine how the language model behaves. Datasets that are used to train the LLM 699 may include thousands of documents, millions of documents, or even more documents. Some examples of LLMs include OpenAI's GPT-3.5 and GPT-4, Google's PaLM or PaLM 6, or others.

As an intermediary, the query service 610 may manage client interactions with the GAI models 697. For example, the query service 610 may expand prompts that are received from a user 601, e.g., via an electronic device 605, before submitting the prompts to the LLM 699. Expanding prompts can provide the LLM 699 with additional information relevant to a particular task, such as by adding additional context about a nature of a task or by adding context-specific details, and may improve the quality of responses received from the LLM 699.

The query service 610 may also curate responses received from the LLM 699, e.g., to verify that the responses are within the scope of a given task, or to validate that the responses are syntactically correct. In some implementations, the query service 610 may manage exchanges of information with a language model, such as the LLM 699, without directly engaging with the user (or client) 601, or with limited engagement of the user 601. For example, when self-debugging code, the query service 610 may generate and provide prompts to the LLM 699 and receive responses from the LLM 699 that are used as potential error solutions that may be applied as the code is self-debugged toward a final state of the code that is error-free.

The provider network (or "cloud provider network") 600 is one common environment for the query service 610. The provider network 600 enables users to use one or more of a variety of types of computing-related resources. Such resources may include, for example, compute resources, which enable the users to execute virtual machine (or "VM") instances and/or containers, to execute batch jobs, or to execute code without provisioning servers. Such resources may also include data/storage resources (e.g., object storage, block-level storage, data archival storage, databases and database tables). Such resources may further include network-related resources, e.g., to configure virtual networks including groups of compute resources, such as content delivery networks (or "CDN") or Domain Name Service (or "DNS"). Such resources may also include application resources (e.g., databases, application build/deployment services). The provider network 600 further enables users to access policies or roles, identity policies or roles, machine images, routers or other data processing resources. Computing-related resources accessible to users of the provider network 600 may be provided as compute services 690, such as a hardware virtualization service that can execute compute instances, storage services 692 that can store data objects, or other services 694. The user 601 (or "customer") of the provider network 600 can use one or more user accounts that are associated with a customer account, though these terms can be used somewhat interchangeably depending upon the context of use. The user 601 may further interact with the provider network 600 via one or more interfaces, such as through use of application programming interface (or "API") calls, via a website or application, or in any other manner.

An API refers to an interface or communication protocol between a client and a server, such that where a client makes a request to a server in a predefined format, the client should receive a response from the server in a specific format or initiate a defined action. In the context of a cloud provider network, APIs provide a gateway for customers to access cloud infrastructure by allowing the customers to obtain data from the cloud provider network or to cause actions within the cloud provider network, thereby enabling the customers to develop applications that interact with resources and services hosted in the cloud provider network. APIs may also enable different services of the cloud provider network to exchange data with one another.

For example, a cloud provider network (or just "cloud"), such as the provider network 600, typically refers to a large pool of accessible virtualized computing resources, including but not limited to compute, storage, or networking resources, applications, and services. A cloud provider network may provide convenient, on-demand network access to its shared pool of configurable computing resources that can be programmatically provisioned and released in response to customer commands, or dynamically provisioned and reconfigured to adjust to variable load. Cloud computing can thus be considered to include both applications delivered as services over a publicly accessible network (e.g., the Internet, or another communication network) and also hardware and software in cloud provider network data centers that provide those services.

As shown in FIGS. 6A and 6B, the query service 610 includes an interface 611, a prompt and response engineering system 613 that includes agents 622 and context aggregators 624, service data 615, and one or more LLM 699. The interface 611, which may typically be an API, provides different entry points for clients to interact, via the query service 610, with an LLM 699. A user 601 may interact with the query service 610 via an electronic device 605. The electronic device 605 may display one or both of a chat-based interface 606 and a canvas interface 607. Interfaces 606, 607 send and receive data via the interface 611 of the query service 610. The chat-based interface 606 may be part of a graphical user interface providing a "chat" type interface commonly associated with LLMs in which users may type text and receive responses.

The canvas 607 may provide a display of graphical architecture diagrams of systems and allow users 601 to make modifications to their systems. For example, the canvas 607 may use different icons to represent different resources (or clusters of similar resources such as autoscaling groups) of an application, and may connect these icons via lines to show network flows between the different resources. The query service 610 may maintain a model of the application architecture visualized in the canvas that it may translate into infrastructure as code ("IaC") definitions, and may also translate IaC definitions into visual architecture diagrams.

The interface 611 may also provide a more programmatic entry point for other applications or services such as an issue management service (also sometimes referred to as issue tracking service), a logging service of the provider network, or the application displaying the interfaces 606, 607 (e.g., an issue management application executed by the electronic device 605). API calls via these type entry points may include, like the chat-based interface, free-form text (e.g., bug descriptions or change requests from an issue tracking system, error messages from the logging service, etc.) but further include additional contextual parameters available to the application or application environment issuing the call.

Generally speaking, the API 611 may provide for interactions with various clients, including human users such as user 601 via interfaces 606, 607, and with other applications such as software development environments, software management systems, issue tracking systems, etc. These application-based clients typically interact with the query service API via calls having a more structured set of parameters (e.g., accepting a structured format file that includes identifications of various data sources) as compared to the freeform text found in calls from the chat-based interface 606, for example.

The query service 610 may support multi-tenancy, allowing multiple clients to connect and interact with LLMs 699. Each client may have one or more sessions with the query service 610, the sessions corresponding to sessions with an LLM 699. To do so, the query service 610 may track, for a given session, the last N prompts sent to, and responses received from the LLM in a memory such as in service data 615. The memory may be implemented as a moving window or circular buffer: as new prompts are sent and responses received, the query service 610 deletes or overwrites the oldest entries. For a given session, the prompt and response engineering system 613 may embed all or a portion of the session memory in prompts submitted to the LLM by any of the agents 622. For example, if a session includes session history X and a new prompt P, the prompt and response engineering system 613 may submit concatenate P to X or to the most M most recent prompts and responses (where $M<N$) and submit the result of the concatenation to the LLM.

The prompt and response engineering system 613 may also monitor client text inputs over a session for certain session-management instructions. The prompt and response engineering system 613 includes agents 622 and context aggregators 624. Agents 622 include various task-specific agents as well as other general agents that support query service interactions with an LLM 699. Task-specific agents formalize various software development effort workflows, operating to expand user prompts, curate LLM responses, and provide the LLM with additional context often without user intervention. Context aggregators 624 retrieve additional data that agents may use to expand prompts or to otherwise provide to an LLM as conversation context to improve the relevance of LLM responses. The context aggregators 624 may retrieve the additional data from other cloud-based services, such as the compute services 690, the storage services 692, or the other services 694.

Service data 615 may include data such as prompt templates, response definitions, user preferences, session state data, etc.

GAI models 697 include LLMs 699 and other models 698. LLMs are artificial intelligence systems designed to understand and generate human-like text. These models are trained using machine learning techniques, typically on vast amounts of text data from the internet, books, articles, and other sources. Often, LLMs use a type of neural network called a transformer to process and understand the patterns and structures of language. In some examples, the query service 610 leverages an LLM trained on the documentation of provider network services as well as application documentation and code examples of applications hosted by or that interface with services of the cloud provider network. The query service may also leverage a more general-purpose LLM trained on a larger variety of texts. Other models 698 may include code generation models, which may be within the same family as LLMs but trained and/or fine-tuned on a corpus more narrowly curated to software development documents (e.g., application code, comments, documentation, programming books, etc.) rather than general texts encompassing a range of other fields.

In the illustrated example, the query service 610 further includes a query service user interface controller 614. The query service UI controller 614 may manage interactions between the query service 610 and a user interface such as the interface 606 or canvas 607 (e.g., to render a graphical view of a software system), interactions between the user interfaces 606 and 607 (e.g., to reflect chat-based inputs on the canvas or vice versa), and interactions between agent results and the user interfaces (e.g., to display the recommended changes associated with an LLM output on the canvas 607). Additional details regarding the query service interface controller 614 are illustrated and described at least with reference to FIG. 6A.

FIG. 6A depicts additional details of the query service 610 according to some examples. Agents 622 include various task-specific agents 607 as well as other general agents that support query service interactions with an LLM 699. Example general agents include an orchestrator agent 601 that may manage a session with a client, a sanitization agent 603 that may ensure prompts and responses are within the scope of various tasks or do not venture into sensitive or objectionable material, and a response validation agent 605 that may evaluate LLM responses against expected results. For example, the response validation agent 605 may validate that content of the response is not objectionable (e.g., does not include profanity), is not copyright protected, or is otherwise valid.

In some examples, the orchestrator agent 601 may be the default agent executed upon connection by an application to the query service 610 with a chat-based interface. Depending on the initial user prompt, the orchestrator agent 601 may identify the task requested to be performed and invoke the associated task-specific agent. The orchestrator agent 601 leverages an LLM to determine whether a given prompt falls within a supported set of tasks and to identify which task-specific agent should be invoked.

In some examples, the sanitization agent 603 reduces the likelihood of the LLM providing objectionable or off-topic responses. Such responses may be artifacts of the LLM operations, resulting in what are sometimes referred to as "hallucinations." Having received a response, a sanitization agent may prompt the LLM (or another LLM, or another instance of the LLM without a saved context) with questions related to the nature of the response, such as to test whether the response contains objectionable material, whether the response is related to the expected field of use (e.g., software development, error resolutions, etc.).

In some examples, the response validation agent 605 (or "validation agent") verifies that an LLM response conforms with the response definition of the preceding prompt. The response validation agent may perform a variety of validations. Example validations include prompting the LLM (or another LLM, or another instance of the LLM without a saved context) with a question as to whether the received response conforms with the response definition of the previous prompt, testing whether the downstream software that processes the response may successfully parse it (e.g., parsing the response in a try-catch statement), and, in the case of code, executing the code in an isolated environment such as a sandbox. For example, a potential error solution provided by an LLM may be combined with code to generate a modified code and the modified code and executed in a sandbox environment to determine if the errors resulting in the modified code correspond to expected errors provided by the LLM that are expected to result with implementation of the potential error solution, as discussed further below.

Example task-specific agents 607 include agents that assist clients with a given task. For example, a system design agent may assist a client in gathering additional information to provide to the LLM to improve the LLM's response to a query. An error resolution agent may automatically debug and resolve errors on behalf of the user and/or determine an efficient resolution to eliminate errors and provide guidance to the user. In some examples, the interface 611 of FIG. 6A may support requests that invoke a particular task-specific agent without relying on the orchestrator agent 601.

Context aggregators 624 gather context about a given software system's environment to be provided to an LLM as part of the prompt expansion operations of the query service 610. Such additional data may range from general documentation applicable to a prompt to specific source code associated with a given component of the software system. Agents 622 may invoke context aggregators, in some cases depending on a previous response from an LLM identifying which additional context would assist it in generating a response. Using the information obtained from the invoked context aggregator(s) 624, agents 622 may provide at least some of that information as additional context in subsequent prompts sent to the LLM.

Some context aggregators 624 may retrieve information from other cloud-hosted services of a provider network or other reachable sources (e.g., sources with public facing APIs external to the provider network). One example of such information is source code and configuration data, which may provide relevant context to an LLM. Another service 694 of the provider network 600 may be a code repository service that stores source code, documentation, and other configuration data in repositories for various client applications. A code repository aggregator 621 may access the code repository service to obtain source code and/or configuration data associated with various components of an identified software system.

In some examples, context aggregators retrieve information about a particular software system. Such may be the case when a client of the query service 610 has engaged it for a task associated with an existing system. The client may provide references to the various cloud-hosted services that include details about the system to the query service 610, and the context aggregators may retrieve that data. In other examples, context aggregators retrieve information about other software systems owned by or otherwise accessible to a principal-typically the identity that was used to authenticate a client. The principal may be a user, group of users, organizational unit within a business, etc. The query service 610 may leverage context aggregators to retrieve details about the other systems of the principal.

A documentation aggregator 633 may use RAG techniques to identify documents of "relevance" to a given task. For example, a RAG technique may include or involve the retrieval of data from outside an LLM, and augment the query by adding relevant retrieved data as context. In this regard, a RAG technique may reduce hallucinations generated by the LLM by guiding outputs received from the LLM to be similar to or based on the retrieved data, rather than outputs that are generated based purely on parameters of the LLM that were learned from one or more training corpora. Initially, each of the available documents with the documentation service may be encoded as an embedding, those embeddings stored in a database. When invoked, the documentation aggregator 633 may use an encoder to generate an embedding from user text for the given task. The documentation aggregator 633 may then identify relevant documents based on the distance between the task embedding and document embeddings in the database, selecting the N nearest document embeddings, document embeddings within some distance threshold, or some other criteria to identify documents having embeddings in proximity to the task embedding. The documentation aggregator 633 may then access the documentation service to obtain the documents associated with those selected embeddings.

Other context aggregators 639 may generate annotated context from data obtained by other context aggregators. For example, some context aggregators may compile and annotate data retrieved by other aggregators into a summary. Such a context aggregator may indicate, for each of the other context aggregators that retrieved data or other information, a description of the source of the information. As another example, some context aggregators may generate structural summaries of a software system. Cloud-hosted software systems are often structured as a collection of interacting services with user code running on various resources to coordinate those interactions. A system map (or "architectural map" or just "map") may describe the structure of a software system. The structure may include details like programs, the cloud-level infrastructure or resources on which those programs are executed, the interconnection of those programs through various data transfers (e.g., API calls, passing JSON objects, etc.), environmental configuration data (e.g., environment variables available to the programs, variables that configure the resources on which programs execute, etc.), network-level configuration data (e.g., VPC configuration data, configuration data of virtual network components like routers or gateways, etc.). In some examples, a system map of the structure of a software system may have been previously defined (e.g., by the developer). In other examples, a system map context aggregator may generate a system map that provides a description of the software system.

Service data 612 may include templates 632, response definitions 634, session data 636, and user preferences 638. Templates 632 may include templates that provide additional text cues beyond what might otherwise be provided by a user. For example, a user might provide a prompt such as "what is causing error X?" A prompt template may encapsulate the user's prompt with various cues that improve the quality of the response of the LLM. One pattern used by agents associated with various tasks described herein is a template to prompt the LLM to ask questions (e.g., "You will be asked to respond to the following prompt: 'what is causing error X?' What information would assist you in your response?"). Prompt templates may be used to expand prompts received from various clients (a human user typing a software error into an issue tracking system that later submits an API call to the query service is likely to use the same abbreviated language as a human user typing an error into a chat session with an LLM). Templates 632 may also include response templates for responses to be sent to clients, populated with data received from the LLM and/or actions taken by the query service (e.g., resolution of errors in code).

Response definitions 634 define how the query service 610 will expect the response from the LLM to be formatted. Response definitions 634 may be used to regularize the responses from LLMs to improve the ability of the query service 610 to parse those responses such that they may be stored, trigger follow on actions, etc. Example response definitions include instructing the LLM to respond in natural language forms such as with a Yes or No, a list of items, an enumerated list of items, etc. and also to respond with more structured forms (e.g., with Python code, with an SQL query, with a JSON object, etc.) Note that the interpretation of responses pursuant to response definitions is typically contingent on the phrasing of a prompt, tailored within a given agent (e.g., a negative response might indicate a pass for one prompt, a failure for another).

Session data 636 may include the historical dialogue with an LLM, as mediated by the query service. Not all prompts that the query service 610 submits to an LLM 699 originate from a client, nor does the query service 610 send all responses from the LLM 699 to the client. For this reason, the session data may include metadata about LLM interactions (e.g., whether a prompt originated from the query service 610 or a client, whether a response from the LLM was sent to a client). For example, while a client may submit a prompt of "can you fix error X?," the query service may sent a prompt to the LLM of "please provide one or more potential solutions to resolve error X."

User preferences 638 may include stored user preferences based on prior dialogs with a client. In particular, the system design agent may elicit information from the client regarding preferences. Such preferences may include attributes or features such as preferred programming language (e.g., to instruct the LLM when requesting code suggestions), preferred compute options for cloud-hosted applications (e.g., a virtual machine, container, serverless function, etc.), permissions preferences (e.g., whether a certain set of principals may access the application), or any other preferences.

While not shown, the service data 612 may include other data such as the types of tasks the query service 610 may support (typically those associated with the available task-specific agents) as well as the types of additional information or context that may be gathered (typically associated with the available context aggregators).

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow chart shown in FIG. 3, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit (s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an," and the word "set," should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system operating on a provider network, wherein the system comprises:

one or more computer processors;

at least one data store having a knowledge base comprising a plurality of documents stored thereon;

a language model executed by the one or more computer processors, wherein the language model is trained based at least in part on a corpus of data, and wherein the corpus of data does not include any of the plurality of documents; and a service executed by the one or more computer processors, wherein the service is configured to perform operations comprising:

receiving at least a free-form description of a question from a user;

converting the free-form description of the question to a first query;

determining a comparison of an embedding generated based at least in part on the first query to each of a plurality of embeddings, wherein each of the plurality of embeddings is generated based on one of a plurality of text chunks extracted from at least one document in a selected domain and augmented with temporal metadata, and wherein the embedding and each of the plurality of embeddings is in a common vector space;

selecting at least a subset of the plurality of text chunks based at least in part on a similarity analysis;

generating, using a large language model, a first response to the question based at least in part on the subset of the plurality of text chunks, wherein the first response comprises a first set of data points identified based at least in part on the temporal metadata;

identifying one of the plurality of documents including at least one of the first set of data points identified based at least in part on the temporal metadata; and providing the first response to the question and the one of the plurality of documents to the user.

2. The system of claim 1, wherein the operations further comprise:

partitioning text extracted from the plurality of documents into the plurality of text chunks, wherein each one of the plurality of documents is in the selected domain;

augmenting the plurality of text chunks with the temporal metadata; and indexing the plurality of text chunks augmented with the temporal metadata, wherein each of the plurality of embeddings is generated based on one of the indexed plurality of text chunks augmented with the temporal metadata.

3. The system of claim 1, wherein the operations further comprise:

generating a second query based at least in part on a portion of the first response to the question comprising at least one of the first set of data points;

generating a second response to the second query, wherein the second response identifies a document including a second set of data points;

determining a comparison of the second set of data points to the first set of data points; and verifying an accuracy of the first set of data points based at least in part on the comparison.

4. A method comprising:

receiving at least a free-form description of a question;

converting the free-form description of the question into a query;

determining comparisons of an embedding generated based at least in part on the query to each of a plurality of embeddings, wherein each of the plurality of embeddings represents at least one of a plurality of text chunks extracted from a plurality of documents and augmented with temporal metadata, and wherein the embedding and each of the plurality of embeddings is in a common vector space;

selecting at least a subset of the plurality of text chunks based at least in part on the comparisons;

generating, using a large language model, a response to the question based at least in part on the subset of the plurality of text chunks, wherein the response comprises a set of data points identified based at least in part on the temporal metadata;

identifying one of the plurality of documents including at least one data point of the set of data points; and providing the response to the question and at least an identifier of the one of the plurality of documents.

5. The method of claim 4, further comprising:

identifying a portion of the response including the at least one data point;

generating a structured query language query based at least in part on the portion of the response;

executing the structured query language query on the plurality of documents;

identifying one of the plurality of documents based at least in part on a response to the structured query language query; and determining that a portion of the one of the plurality of documents includes the at least one data point.

6. The method of claim 4, further comprising:

identifying a portion of the response including one of the set of data points;

generating a structured query language query based at least in part on the portion of the response;

executing the structured query language query on the plurality of documents, wherein at least the portion of the at least one of the plurality of documents is identified based at least in part on a response to the structured query language query;

determining that the at least one data point differs from the one of the set of data points; and substituting the at least one data point for the one of the set of data points in the response.

7. The method of claim 4, wherein identifying the one of the plurality of documents comprises:

executing a regular expression function on the response and the plurality of documents, wherein the one of the plurality of documents is identified by the regular expression function.

8. The method of claim 4, wherein receiving at least the free-form description comprises:

receiving at least the free-form description and at least one document, wherein generating the response to the query comprises:

providing at least the query and the at least one document as inputs to the large language model, wherein the response is generated based at least in part on an output received from the large language model in response to the inputs.

9. The method of claim 4, further comprising:

converting the free-form description of the question to the query in a structured query language by a query generator module.

10. The method of claim 4, wherein receiving at least the query comprises:

calculating at least one quality score based at least in part on the query;

determining that the query is not optimal based at least in part on the at least one quality score;

prompting a user to provide additional information regarding the query;

receiving the additional information regarding the query; and updating the query to include at least some of the additional information, wherein the subset of the plurality of text chunks is identified based at least in part on the updated query.

11. The method of claim 4, further comprising:

determining contextual information regarding the query; and augmenting the query to include at least some of the contextual information, wherein the contextual information comprises at least one of:

a time associated with the query;

a theme associated with the query; or a summary of the query, and wherein the embedding is generated based at least in part on the augmented query.

12. The method of claim 4, wherein the one of the plurality of documents comprises at least one of:

a financial record;

a legal opinion; or a medical report.

13. The method of claim 4, wherein determining the comparisons comprises:

generating the plurality of embeddings, wherein each one of the plurality of embeddings is generated based on one of the plurality of text chunks; and performing a similarity analysis on each one of the plurality of embeddings based at least in part on the embedding generated based at least in part on the query, wherein each one of the comparisons is determined based at least in part on the similarity analysis.

14. The method of claim 13, further comprising:

determining a ranking of at least the plurality of text chunks based at least in part on the comparisons, wherein the subset of the plurality of text chunks is identified based at least in part on the ranking.

15. The method of claim 4, further comprising:

partitioning text extracted from the plurality of documents into the plurality of text chunks;

augmenting the plurality of text chunks with the temporal metadata; and indexing the augmented plurality of text chunks in a database.

16. The method of claim 4, wherein at least one of the plurality of documents is associated with a user, and wherein the response to the question and the identifier of the one of the plurality of documents are provided to the user.

17. A non-transitory computer-readable storage medium having executable instructions stored thereon that, when executed by one or more processors of a computer system, cause the computer system to at least:

receive at least a query;

generate a response to the query based at least in part on a plurality of text chunks extracted from a corpus of documents, wherein the plurality of text chunks are augmented with temporal metadata and indexed in a database, and wherein the response includes a first set of quantitative data points identified based at least in part on the temporal metadata;

identify a second set of quantitative data points based at least in part on the response, wherein each one of the second set of quantitative data points corresponds to one of the first set of quantitative data points;

compare a first quantitative data point of the first set of quantitative data points to a second quantitative data point of the second set of quantitative data points; and provide at least a portion of the response and an identifier of a source of a quantitative data point in the portion of the response, wherein the quantitative data point in the portion of the response is the first quantitative data point and the source is one of the corpus of documents including the first quantitative data point if the first quantitative data point equals the second quantitative data point, and wherein the quantitative data point in the portion of the response is the second quantitative data point and the source is one of the corpus of documents including the second quantitative data point if the first quantitative data point does not equal the second quantitative data point.

18. The non-transitory computer-readable storage medium of claim 17, wherein the executable instructions, when executed by the one or more processors of the computer system, further cause the computer system to at least:

generate a structured query language query based at least in part on the portion of the response; and identify a response to the structured query language query based at least in part on the corpus of documents, wherein the response to the structured query language query includes the second set of quantitative data points.

19. The non-transitory computer-readable storage medium of claim 17, wherein the executable instructions, when executed by the one or more processors of the computer system, further cause the computer system to at least:

generate an embedding based at least in part on the query;

identify a plurality of embeddings, wherein each one of the plurality of embeddings is generated based on one of the plurality of text chunks; and perform a similarity analysis on each of the plurality of embeddings based at least in part on the embedding, wherein the response to the query is generated based at least in part on a subset of the plurality of text chunks identified based at least in part on the similarity analysis.

20. The non-transitory computer-readable storage medium of claim 17, wherein the executable instructions, when executed by the one or more processors of the computer system, further cause the computer system to at least:

receive at least one document; and provide at least the query and the at least one document as inputs to a large language model, wherein the response is generated based at least in part on an output received from the large language model in response to the inputs.

* * * * *